Sept. 5, 1967 H. G. JENSEN ET AL 3,339,839
INCOME TOTALIZING DEVICE
Filed June 14, 1965 10 Sheets-Sheet 4

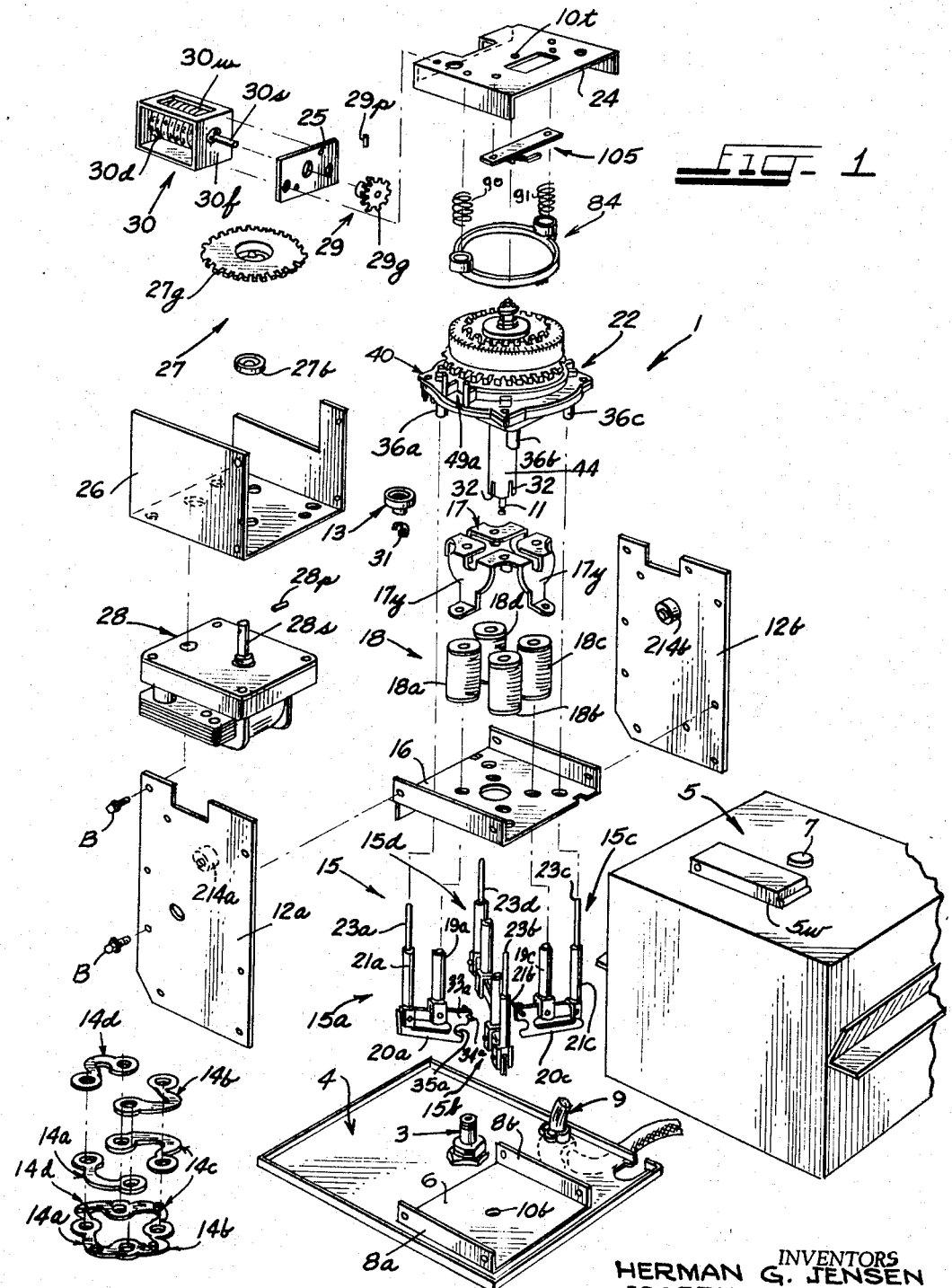
FIG-1
INVENTORS
HERMAN G. JENSEN
JOSEPH E. WRIGHT, JR.
BY
ATT'Y

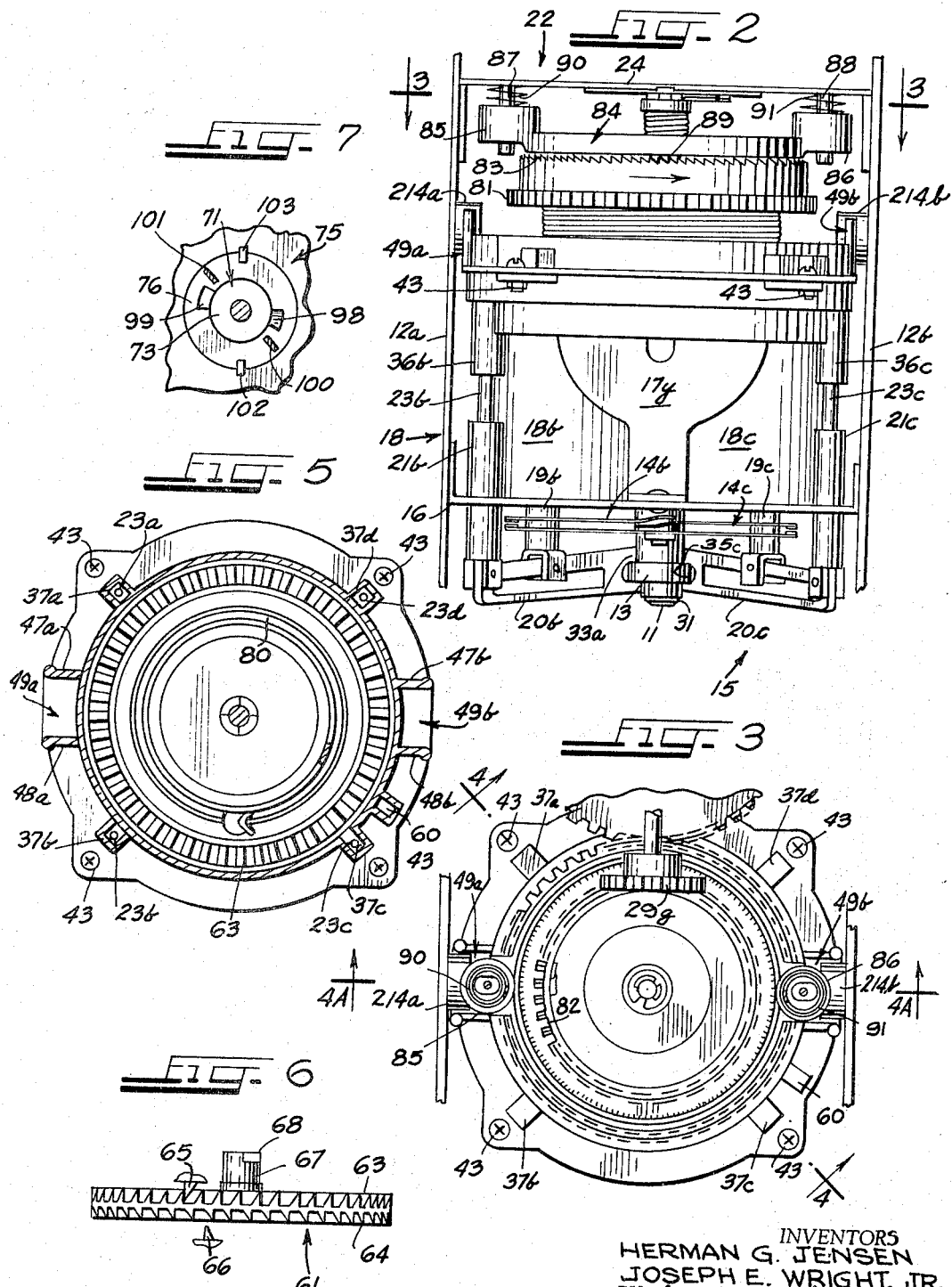

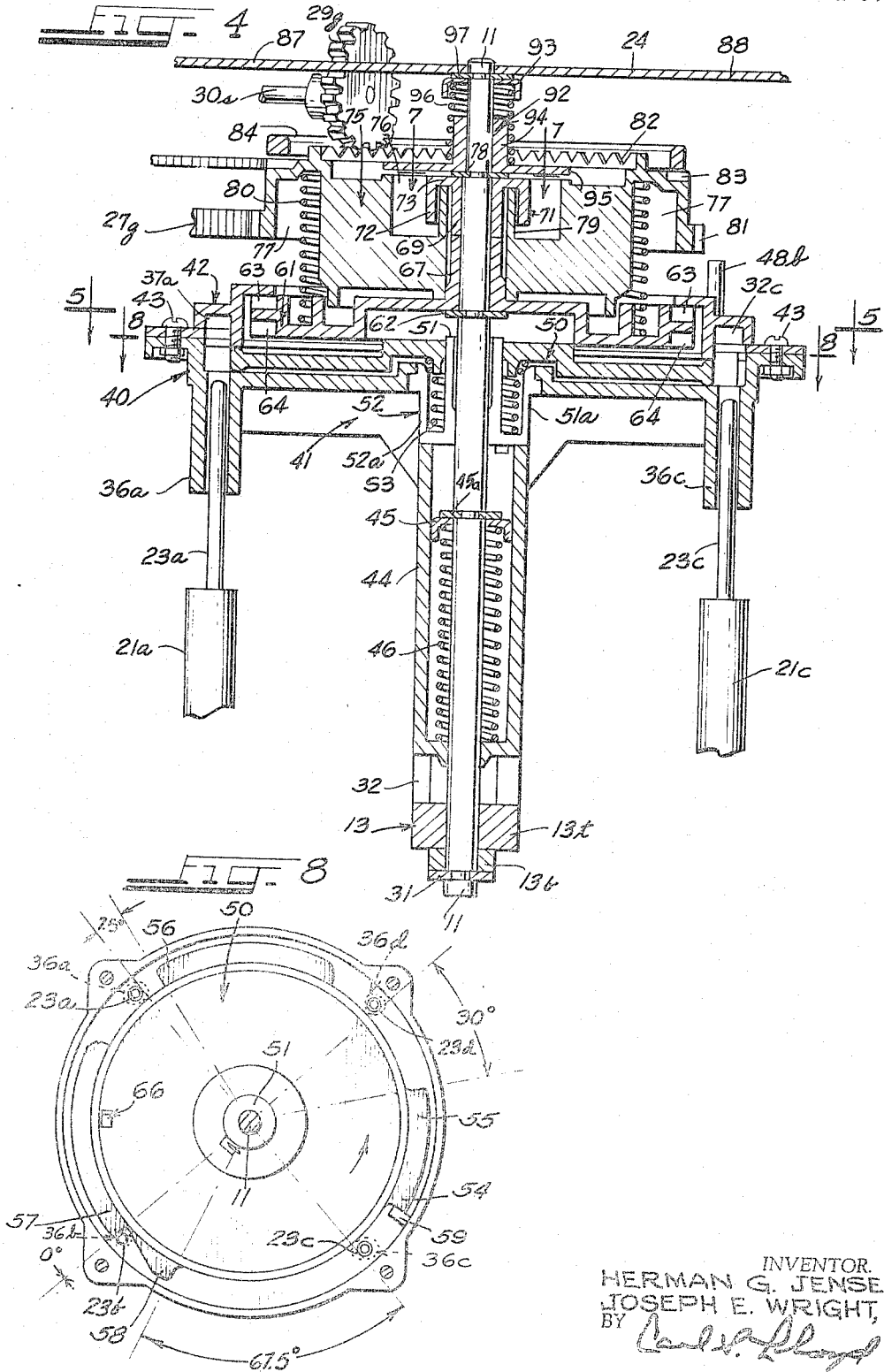

INVENTORS
HERMAN G. JENSEN
JOSEPH E. WRIGHT, JR.
BY

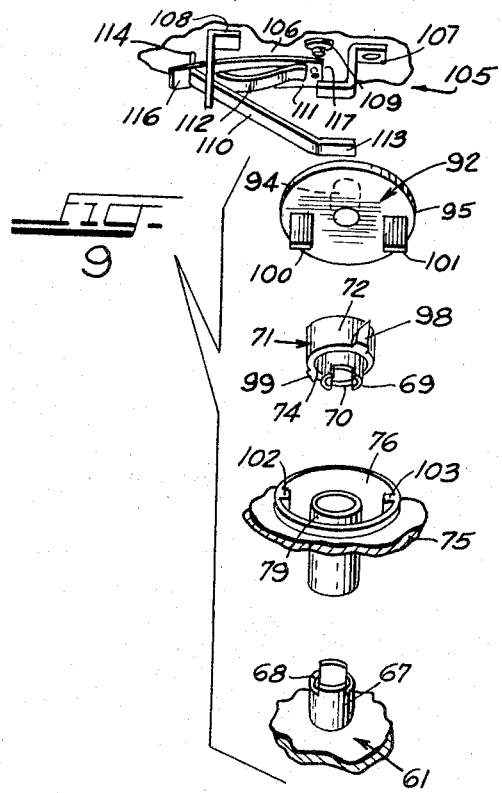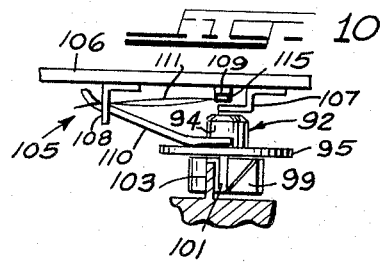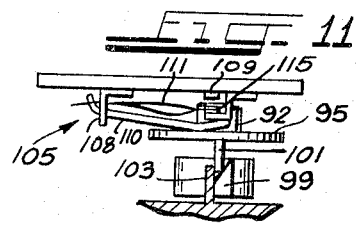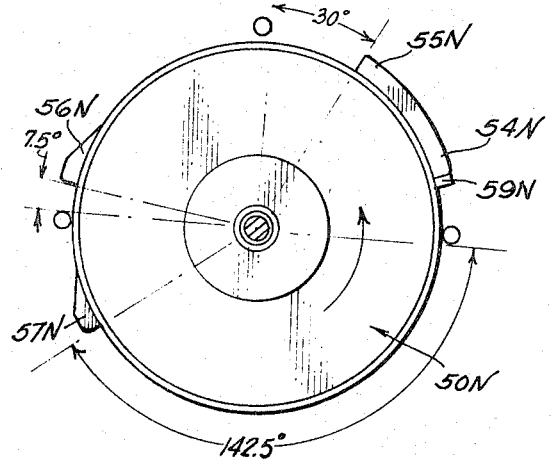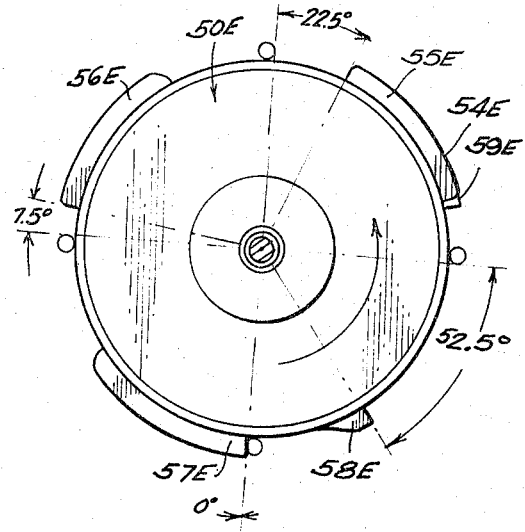

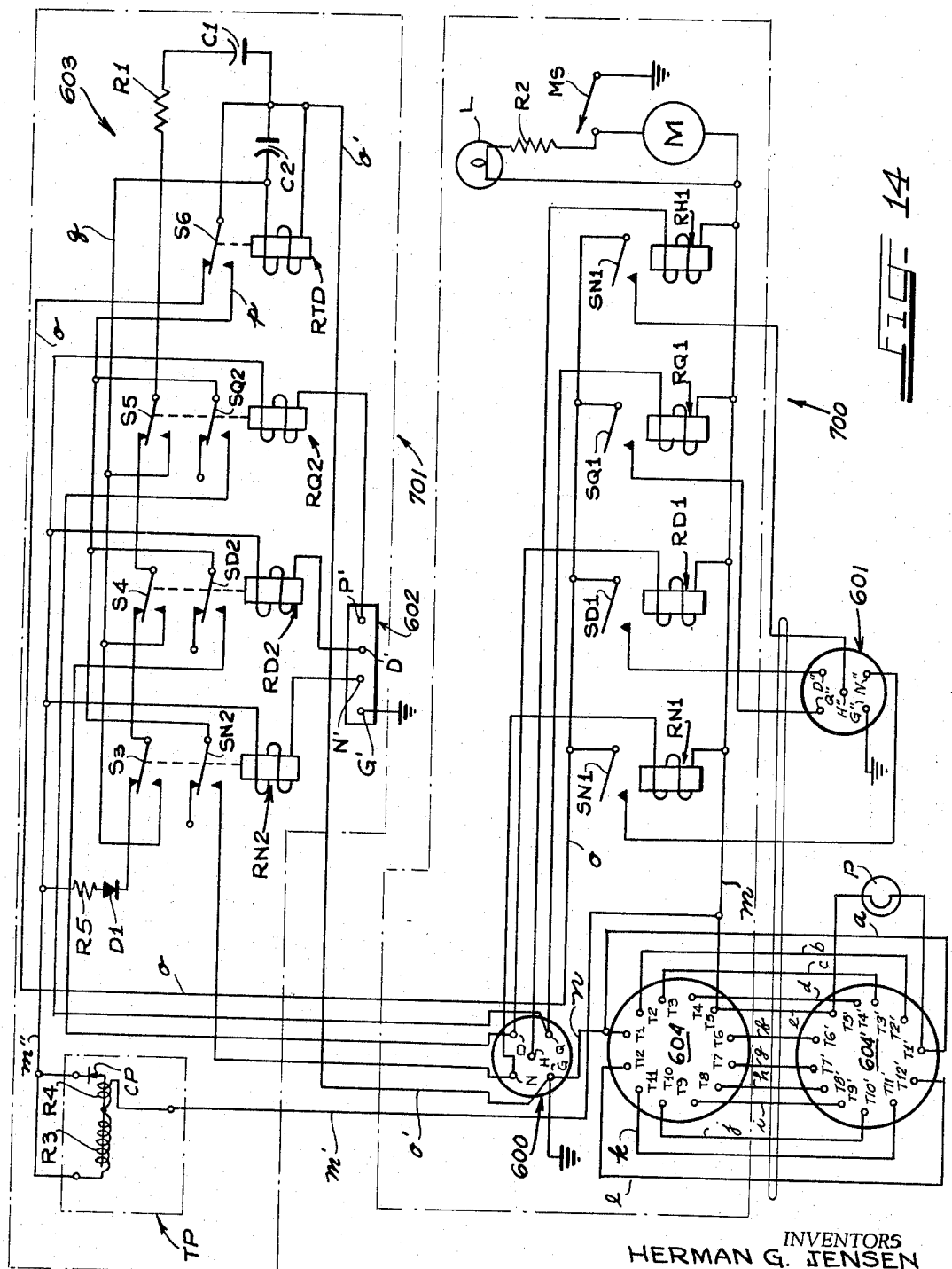

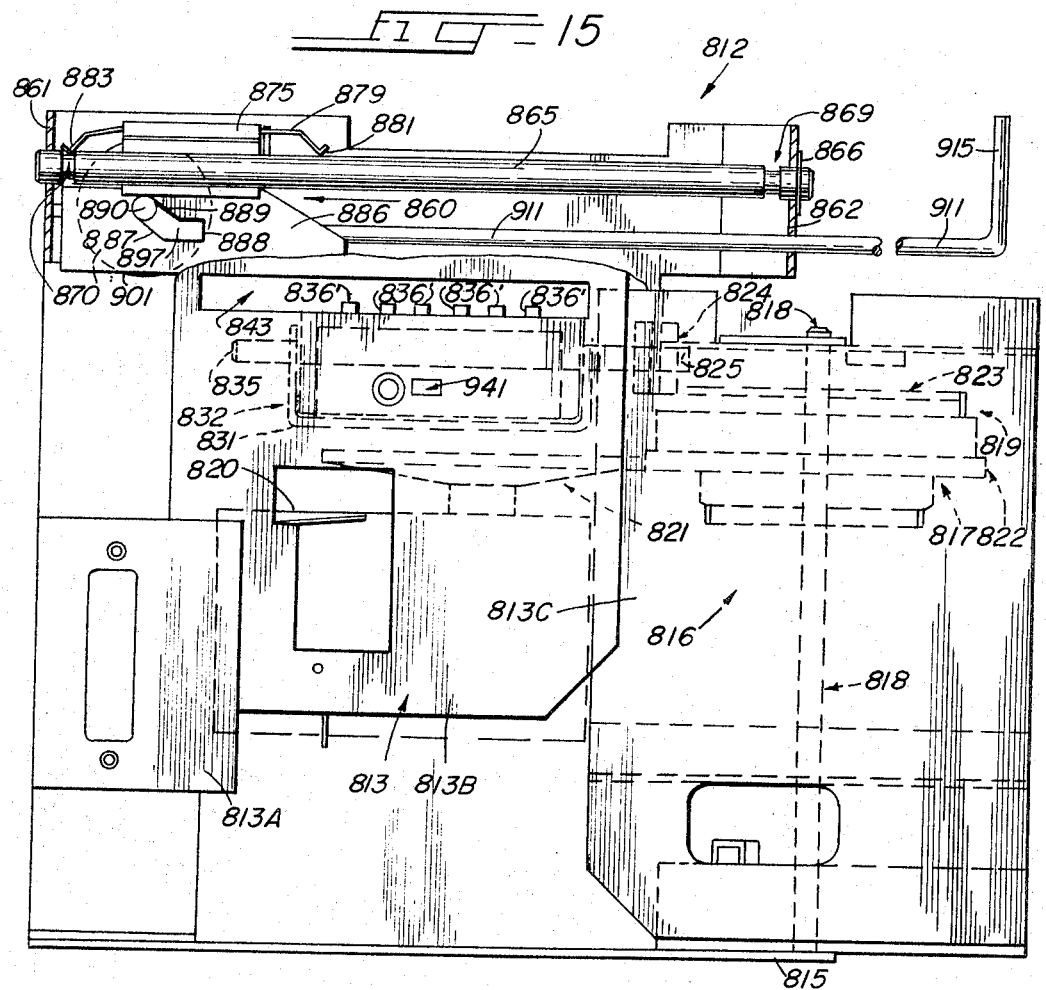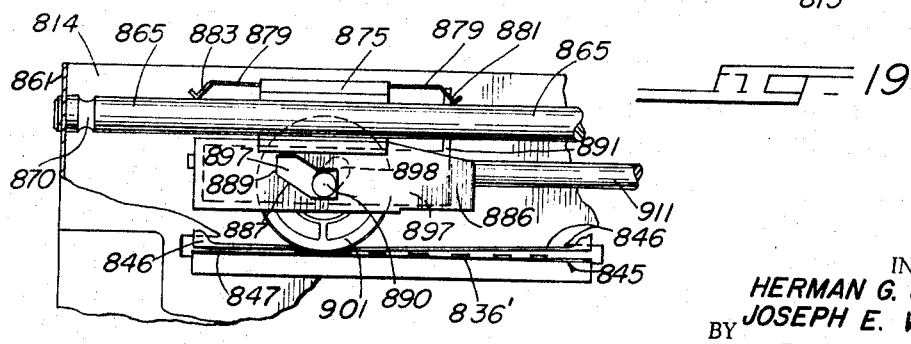

Sept. 5, 1967  H. G. JENSEN ET AL  3,339,839
INCOME TOTALIZING DEVICE
Filed June 14, 1965  10 Sheets-Sheet 8
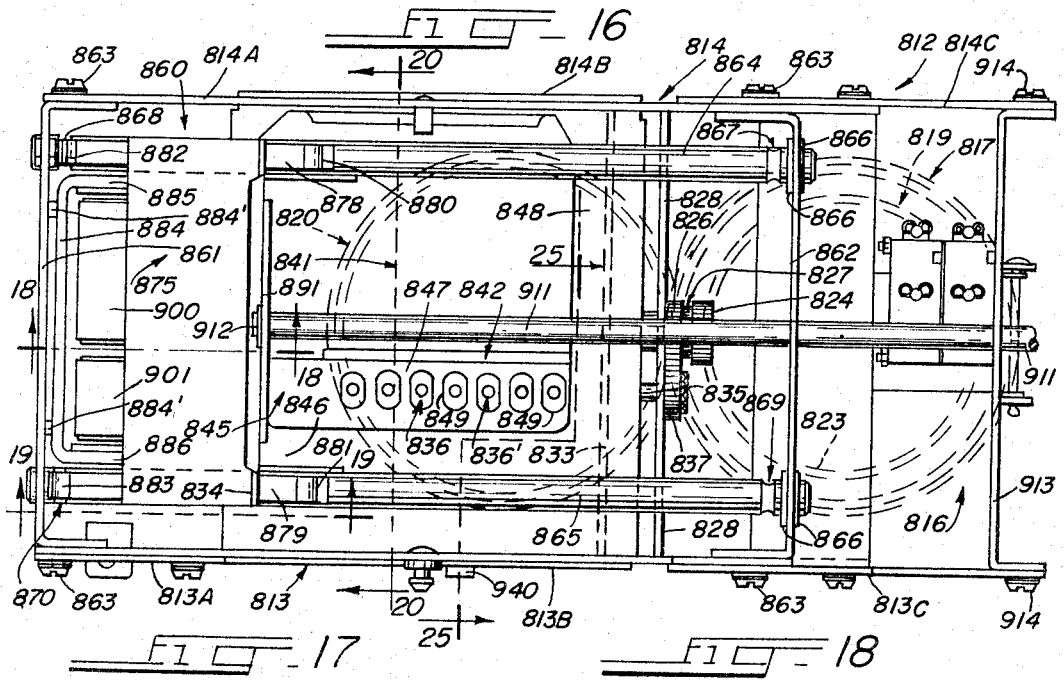
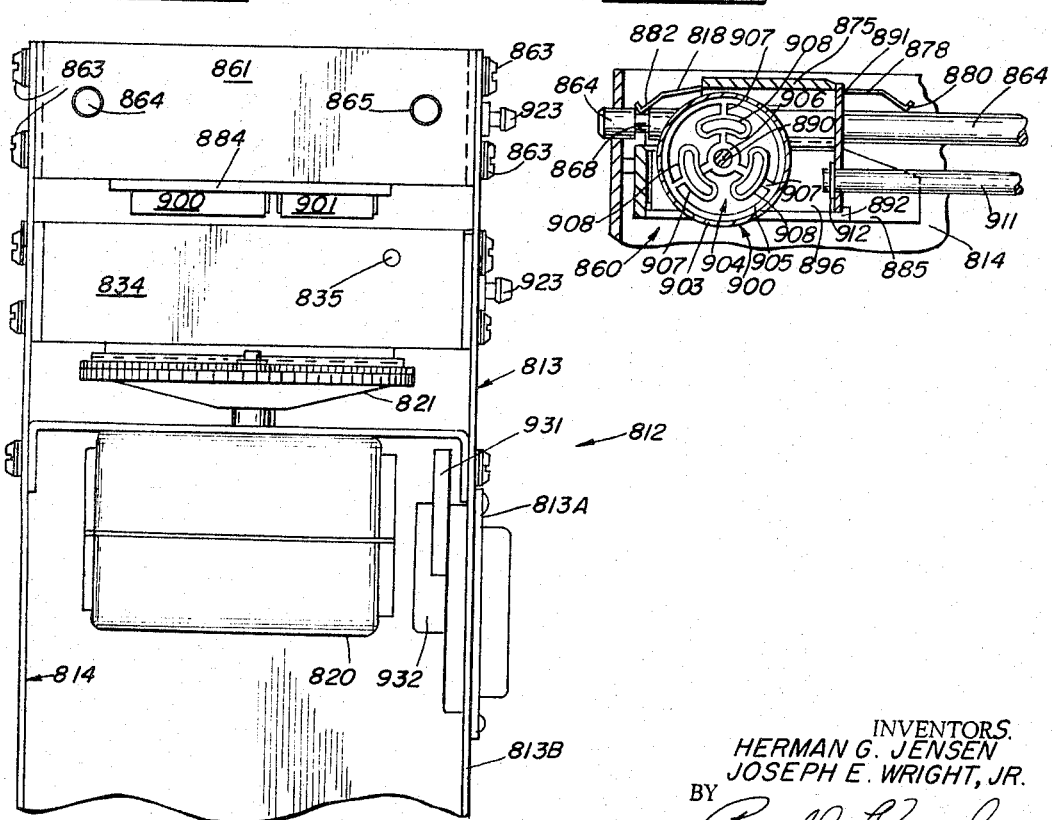
INVENTORS.
HERMAN G. JENSEN
JOSEPH E. WRIGHT, JR.
BY Ronald Hingel
ATTY.

Sept. 5, 1967     H. G. JENSEN ET AL     3,339,839
INCOME TOTALIZING DEVICE
Filed June 14, 1965     10 Sheets—Sheet 9
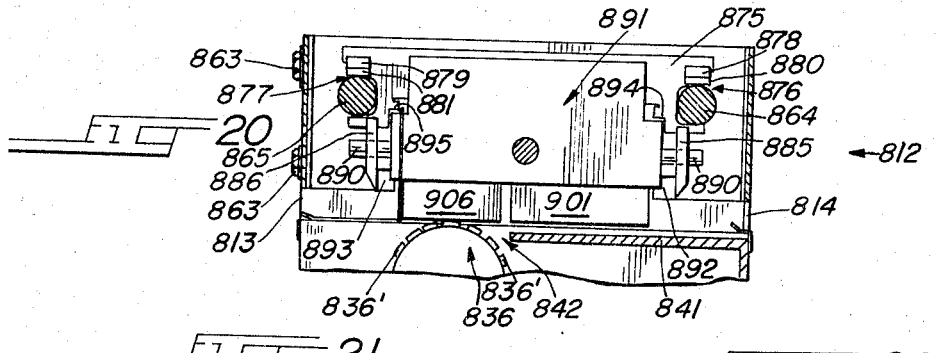
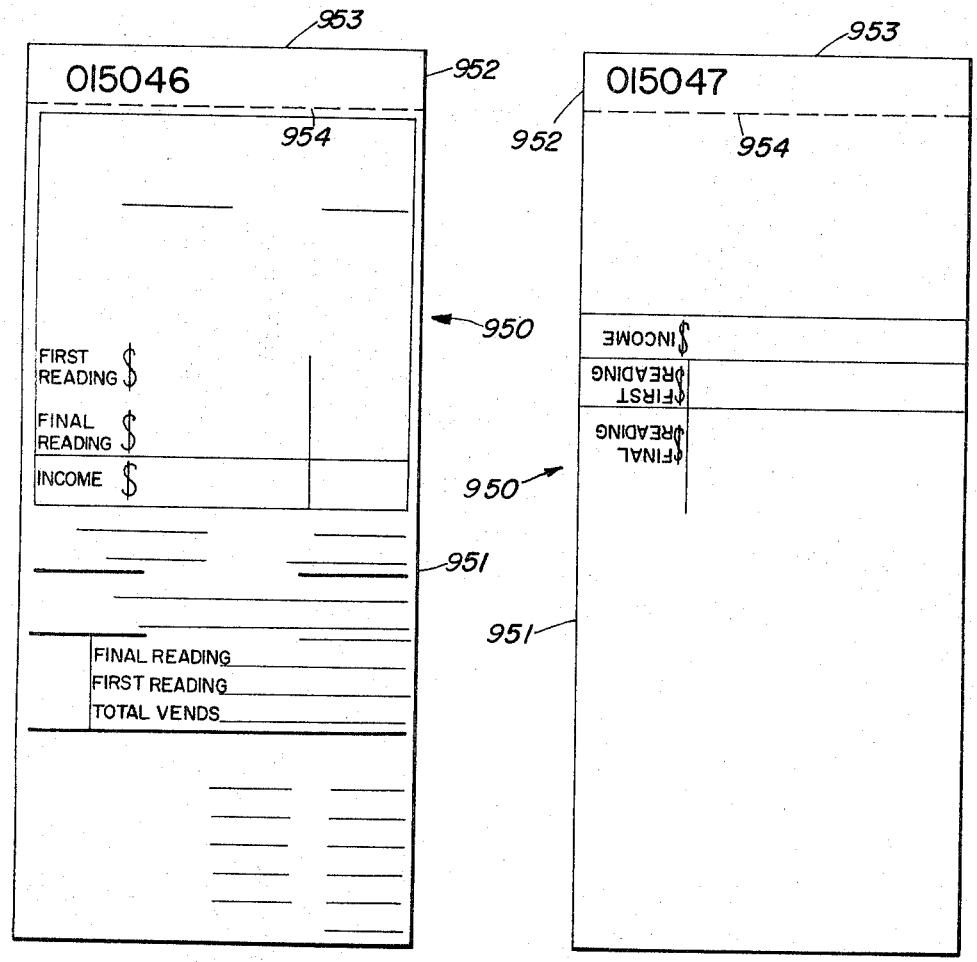

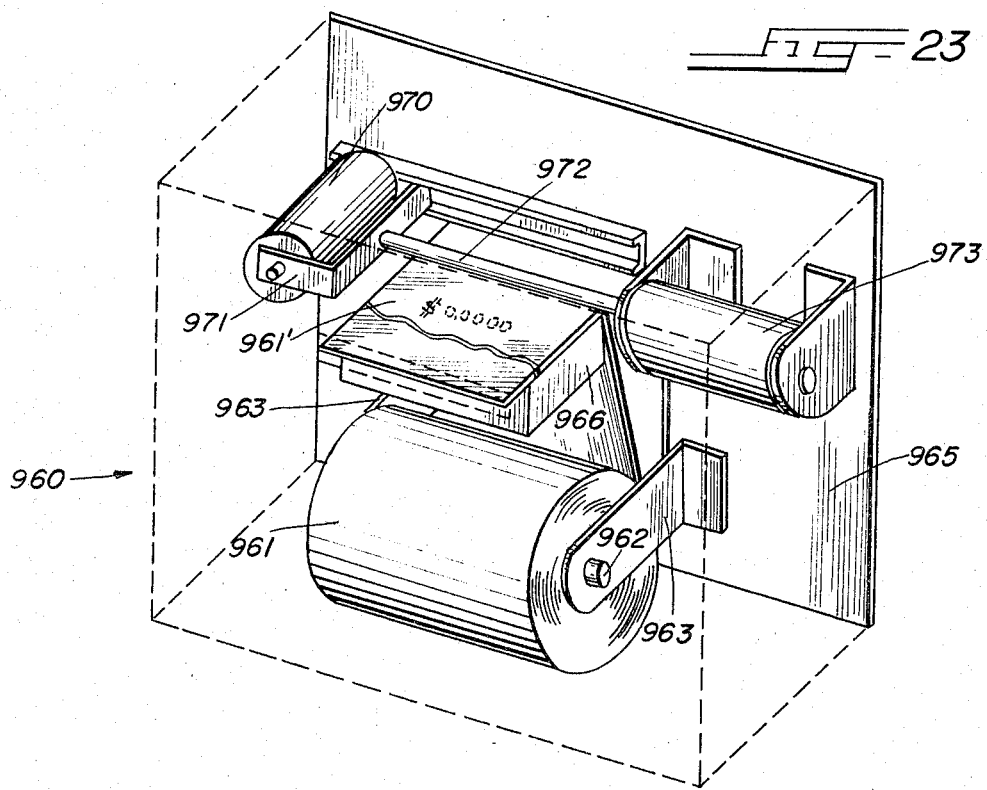
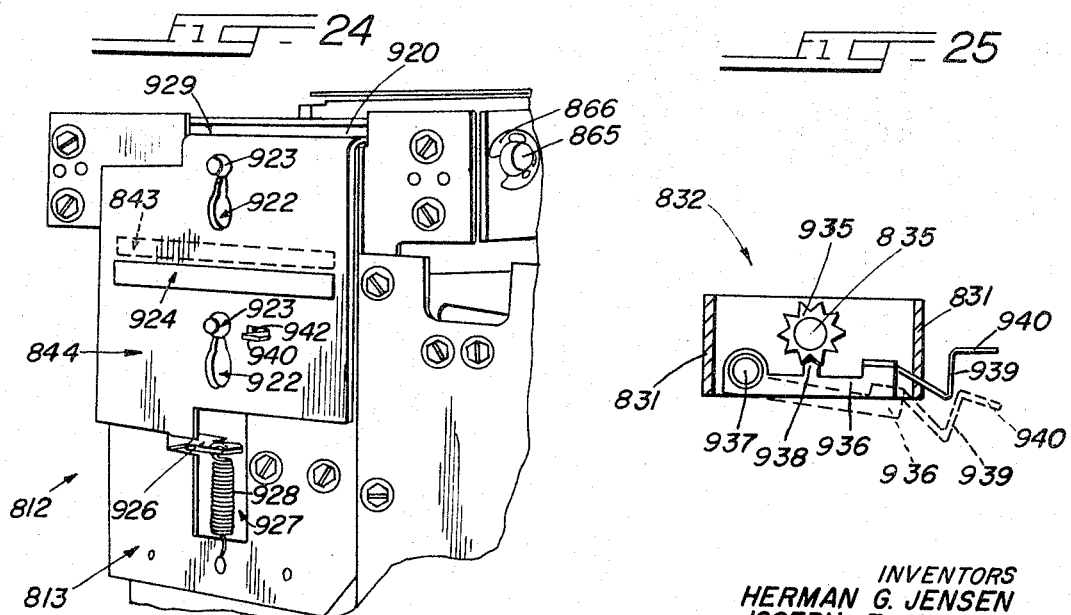
INVENTORS
HERMAN G. JENSEN
JOSEPH E. WRIGHT, JR.
BY Ronald Slingel
ATTY

United States Patent Office 3,339,839
Patented Sept. 5, 1967

3,339,839
INCOME TOTALIZING DEVICE
Herman G. Jensen, Chicago, and Joseph E. Wright, Jr., Rockford, Ill., assignors to The Seeburg Corporation, Chicago, Ill., a corporation of Delaware
Filed June 14, 1965, Ser. No. 472,382
32 Claims. (Cl. 235—100)

ABSTRACT OF THE DISCLOSURE

An apparatus for totalizing the value of coins deposited in a coin-receiving mechanism. Each deposited coin actuates an associated solenoid to produce a longitudinal displacement of the housing of the apparatus and moves a pawl actuator into engagement with a ratchet wheel. The ratchet wheel is spring biased for rotational movement, and as the pawl actuator engages the ratchet wheel the ratchet wheel is disengaged from the housing to rotate in conjunction with the pawl actuator. A pin member controlled by the energized solenoid engages the pawl actuator and limits the conjoint rotation of the pawl actuator and the ratchet wheel. The ratchet wheel is then locked in its new position and a motor driven gear member, which is activated upon displacement of the ratchet wheel, follows or "tracks" the ratchet wheel until the original relative orientation of the ratchet wheel and gear member is reattained. Simultaneously, a gear arrangement drives a counter to register the new cumulative total.

---

This application is a continuation-in-part of application Ser. No. 237,632, filed Nov. 14, 1962, now abandoned.

This invention relates generally to the art of income totalization and more particularly to means for cumulatively totaling the value of credits established in a credit responsive mechanism and for recording the totalized values (as on a counter meter or on a permanent recording form).

When a vending machine is installed in a given location, the coins which accumulate therein must be periodically removed. Typically, the coin removal is performed by a route man who services a multiplicity of machines. It is obviously desirable that an accurate and independent system be established to record the value of coins received in a given machine.

With a cumulative recorder of coin values, one is able to determine the total amount of the coins received in a machine as well as the incremental amount (by subtraction) received since the last emptying of the cash box. This information not only impedes theft of the receipts but also serves to indicate quickly and reliably how well a given machine is performing in terms of cash accumulated. The performance indication is useful both with respect to the vending of products and of services and is particularly desirable when an intangible service is dispensed by machine, as, for examples, a typical coin-operated phonograph installation, or a coin-operated washing or cleaning machine.

The subject invention provides an electro-mechanical device for indicating the cumulative total (and thereby the incremental) value of credits established in a credit responsive mechanism, such as a typical coin-operated vending installation. In the preferred embodiments described herein, recordation is effected for cumulative total values of coins of varying denominations that are deposited in a coin sensitive mechanism. The device utilizes first and second movable members normally retained in a given rest position in a frame housing. Credit signal means are provided for selective response to the denomination of a credit value established in the coin sensitive mechanism (as by the deposit therein of a coin). Means responsive to the credit signal means are provided to effect a positioning of the said first member relative to its given rest position by a predetermined increment that corresponds to the denomination of the credit value established (e.g., an increment of zero for a first credit value, some finite increment for a second credit value, a larger finite increment for a third credit value, etc.). Means are provided for translating the said positioning of the said first member relative to its given rest position into a corresponding positioning of the said second member relative to its given rest position, and means responsive to the said positioning of the said second member are utilized to indicate the value of the established credit. In the preferred embodiments described herein, this indication takes the form of an incremental money value change on a gear counter meter mechanism, which is utilized for visual observation or for permanent print-recording of the totalized income.

More specifically, in the preferred embodiments of the invention hereinafter described, the first movable member takes the form of a credit (i.e., coin) determinative pawl actuator comprising a cylindrical disc mounted in the frame housing for rotation with respect to a shaft and having peripherally extending abutment stops which are positioned so as to co-act with reciprocable extension plungers which extend into the frame housing upon a coin signal and thus serve to impede the rotation of the coin determinative pawl actuator after a predetermined angular displacement of the pawl actuator determined by the coin value signaled. Likewise, the second movable member takes the form of a ratchet wheel that is also mounted in the frame housing for rotation with respect to the shaft, and, as hereinafter described, the extent of angular displacement of the ratchet wheel is determined by the corresponding extent of angular displacement of the coin determinative pawl actuator due to an interengaging pawl relationship between the actuator and the ratchet wheel. Ultimately, the ratchet wheel rotation is transformed into a gear movement by means of a rotatable gear member which is co-axially mounted with the ratchet wheel and which is driven in response to a change in the relative angular orientation of the gear member and the ratchet wheel. The gear member tracks and follows the rotated ratchet wheel until the initial angular orientation is again achieved.

Spring means interconnect the gear member and the ratchet wheel such that motive power for the rotation of the ratchet wheel relative to the stationary gear member is provided by expansion of the spring means and such that motive power is stored by winding the spring means as the tracking gear member rotates to re-orientate itself relative to the stationary ratchet wheel.

An income totalizing device having the preferred features described above exhibits non-jamming accurate response even with rapid successive coin signals since the coin value recorded in the counter mechanism by the gear member is a function of the relative disposition of the ratchet wheel and the gear member which are adapted to rotate at respectively different speeds, thereby enabling a relatively rapid rotation of the ratchet wheel followed by a relatively slow rotation of the tracking gear member which is gear driven by suitable motor means.

As previously indicated, the present invention further contemplates the provision of a cumulative coin value totalizer of the type described in combination with an apparatus for transforming a totalized cumulative receipts value into a permanent printed record. Thus, in the described embodiments, means for cumulatively totalizing the value of deposited coins are mounted in a frame or housing, and the said means include a conventional counting meter formed of a plurality of discs having raised numerals formed thereon. Means on the frame are provided for supporting a data recording form adjacent the raised numerals of the counting meter. Platen roller printing means, preferably internally spring loaded, are slidably provided on the frame for movement from a first position to a second position, such movement causing the data recording form to be uniformly pressed against the raised numerals of the counting meter. Preferably, anti-cheat means are provided whereby the coin-receiving equipment associated with the coin totalizing device is disenabled during the printing function. Thus, coins cannot be inserted in the machine during the recording operation in the hope that the value thereof will not be registered. Warning signal means are also preferably provided so as to indicate that the recording income totalizing device is conditioned for data recording and hence disenabled for coin receiving.

The present invention also provides circuitry means to signal to the income totalizing device the various denominations of coins received in the machine and to provide for a credit signal to be emitted from the device for appropriate credit registrations in a conventional credit sensing mechanism. As a further feature, a signal lamp, which is visible from the exterior of the vending unit, is illuminated for finite durations proportional to the coin values signaled so that the proper functioning of the income totalizing device may be readily checked and visually observed.

A primary object of the present invention is to provide for the cumulation and the recordation of coin values inserted into a coin receiving mechanism by a unique income totalizing system which is compact, reliable, accurate, and essentially tamper-proof.

A related object of the present invention is to provide a device adapted for use in obtaining permanent printed records of the cumulative value of coins deposited in coin-sensitive equipment.

Another object of the present invention is to provide a device of the character described wherein the cumulative coin value is printed on a data recording form by means of an integrally spring-loaded, slidable platen roller assembly.

Still another object is to provide a device of the character described in which the coin-receiving and totalizing equipment is disenabled during the data recording operation.

A further object of the present invention is to provide an income totalizing system which may be utilized for income evaluations in any one of a variety of currencies, both domestic and foreign, and in fact which may be readily converted by a simple substitution of parts for use with one or the other of such currencies.

Still another object of the present invention is to provide an income totalizing device which exhibits anti-jamming characteristics and which readily accommodates and totalizes even a rapid succession of deposited coins.

Other important objects of the present invention are to provide an income totalizing device which is contained in a limited-access box; which records the cumulative value of coins received on a conventional counter meter mechanism, the indicia of which are visible through a viewing window in the box; and which is correlated through appropriate circuitry to display a signal illumination indicating the individual coin values received and to emit credit signals from the income totalizing device for appropriate routing through conventional credit sensing mechanisms.

These and other objects, advantages, and features of the subject invention will hereinafter appear, and, for purposes of illustration, but not of limitation, exemplary embodiments of the subject invention are shown in the appended drawings in which:

FIGURE 1 is a perspective exploded view of an income totalizing device constructed in accordance with the teachings of this invention;

FIGURE 2 is an assembled elevational view of a portion of the apparatus shown in FIGURE 1 and particularly illustrating the computer assembly 22, the solenoid assembly 18, and the coin signal assembly 15;

FIGURE 3 is a top sectional view taken along the line 3—3 of FIGURE 2;

FIGURE 4 is an enlarged elevational view in section, taken along the line 4—4 of FIGURE 3;

FIGURE 5 is a top sectional view, taken along the line 5—5 of FIGURE 4;

FIGURE 6 is a side elevational view of the ratchet wheel component of the computer assembly 22;

FIGURE 7 is a fragmentary top sectional view, taken along the line 7—7 of FIGURE 4, showing the cam assembly arrangement of the computer assembly 22;

FIGURE 8 is a top sectional view, taken along the line 8—8 of FIGURE 4, showing the coin determinative pawl actuator arrangement of the computer assembly 22, suitable for use in a coin system based on relative coin values of 1:2:5:10, as in the nickel, dime, quarter, and half-dollar sequence of the United States coin system;

FIGURE 9 is an exploded perspective view of the cam assembly;

FIGURE 10 is a fragmentary side elevational view partly in section of the assembled cam assembly, showing the switch actuator in its switch closed-circuit position;

FIGURE 11 is a similar view, showing the switch actuator in its switch opened-circuit position;

FIGURE 12 is a top plan view of another coin determinative pawl actuator suitable for use in a coin system based upon relative coin values of 1:2.5:10, as in the ten cent, twenty-five cent, and guilder sequence of the Netherlands coin system;

FIGURE 13 is a top plan view of still another coin determinative pawl actuator suitable for use in a coin system based upon relative coin values of 1:2:4:8, as in the three pence, six pence, shilling, and florin (two-shilling) sequence of the English coin system;

FIGURE 14 is a schematic circuit diagram of circuitry suitable for use with an income totalizing device of the type shown in the preceding figures;

FIGURE 15 is a front elevational view (with parts broken away and removed for clarity) of an embodiment of the present invention that is especially designed for permanent recording of totalized income;

FIGURE 16 is a plan view of the embodiment shown in FIGURE 15;

FIGURE 17 is a fragmentary left side elevational view thereof;

FIGURE 18 is a sectional view taken along line 18—18 in FIGURE 16;

FIGURE 19 is a sectional view taken along line 19—19 in FIGURE 16;

FIGURE 20 is a sectional view taken along line 20—20 in FIGURE 16;

FIGURE 21 is a plan view of a recording form especially designed for use with the recording income totalizing device of the present invention;

FIGURE 22 is a plan view of a modified data recording form;

FIGURE 23 is a schematic perspective view of a modified recording income totalizing device produced in accordance with the present invention;

FIGURE 24 is a fragmentary front perspective view of the embodiment shown in FIGURE 15; and FIGURE 25 is a sectional view taken along line 25—25 in FIGURE 16.

*Income totalizing device—general description*

Figure 4A:
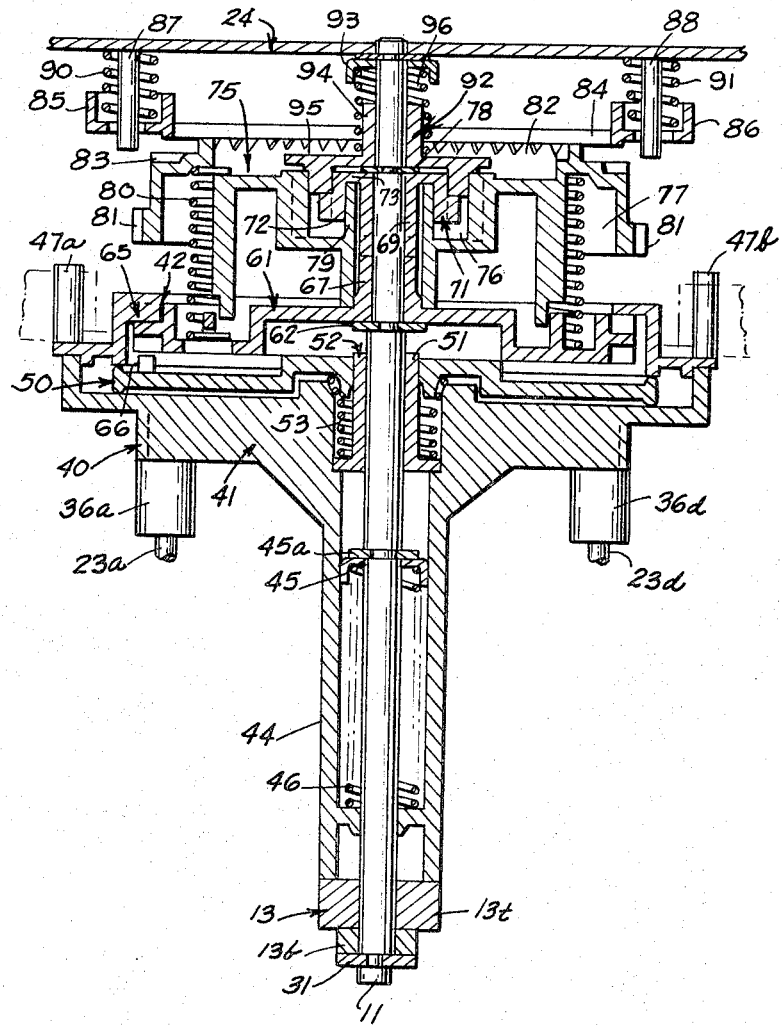
FIGURE 4A is a similar view, taken along the line 4A—4A of FIGURE 3.

An income totalizing device 1 is shown generally in exploded form in FIGURE 1. The device 1 is assembled for location within a limited access box defined by a base plate 4 and a cover 5. The base plate 4 is provided with a conventional lock assembly 3, and cover 5 is provided with a lock bolt 7 such that cover 5 may be removed only by insertion of a suitable key into a lock provided in lock assembly 3. In this fashion, access to the operative components of income totalizing device 1 is restricted to authorized persons in possession of an appropriate unlocking key.

A bottom channel plate 6 is affixed to base plate 4 as a first support member. Sidewalls 12a and 12b are attached to side flanges 8a and 8b respectively of the bottom channel plate 6. Similarly, an intermediate channel plate 16 is positioned between parallelly aligned sidewalls 12a and 12b as a further support member, and a top channel plate 24 is likewise positioned between sidewalls 12a and 12b. A motor supporting plate 26 is positioned between sidewalls 12a and 12b and between intermediate channel plate 16 and top channel plate 24. A counter supporting plate 25 is attached to top channel plate 24 between the extending sidewalls of the motor supporting plate 26. A solenoid supporting clamp 17, having four depending leg portions 17y, is affixed to intermediate channel plate 16 in the space defined between intermediate channel plate 16, top channel plate 24, and sidewalls 12a and 12b. Suitable bolts, such as the bolts B shown in FIGURE 1, are utilized to assemble the various support components.

A computer assembly 22 is located between solenoid supporting clamp 17 and top channel plate 24; a solenoid assembly 18, comprising solenoids 18a, 18b, 18c, and 18d, is located between solenoid clamp 17 and intermediate channel plate 16; a coin signal assembly 15, which is operatively connected to solenoid assembly 18 and to computer assembly 22, is located between intermediate channel plate 16 and bottom channel plate 6; a drive motor and reduction gear assembly 28 is affixed to motor supporting plate 26 for operative engagement with computer assembly 22 via a drive gear assembly 27; and a counter assembly 30 is affixed to counter supporting plate 25 for operative engagement with computer assembly 22 via a counter gear assembly 29.

Drive motor and reduction gear assembly 28 is a conventional arrangement for imparting rotation to a shaft 28s thereof upon an appropriate electrical signal. Drive gear assembly 27 comprises a drive gear 27g which is mounted for rotation with shaft 28s between a collar bearing 27b and a lock pin 28p which extends through shaft 28s.

Counter assembly 30 is a conventional gear driven meter device comprising a frame housing 30f having a shaft 30s mounted for rotation therein. Discs 30d are mounted on shaft 30s for rotation therewith and are visible through a window 30w, which is aligned with a moveable hinge element 5w of cover plate 5, such that hinge element 5w may be displaced to expose discs 30d for a view from the exterior of the assembled income totalizing device 1. Discs 30d sequentially rotate with shaft 30s so as to indicate by the position of suitable indicia on the faces of the respective discs a numerical value corresponding proportionately to the number of revolutions of shaft 30s, in a conventional manner. Counter gear assembly 29 comprises a counter gear 29g mounted on shaft 30s by a lock pin 29p so that rotation of shaft 30s may be effected by rotation of counter gear 29g.

An electrical connection cable 9, which extends through base plate 4, conveys electrical signals to and from income totalizing device 1. For instance, signals representing the receipt into a coin sensitive device (such as a vending machine) of deposited coins having varying denominations are relayed to solenoid assembly 18; and correspondingly electrical signals from switches 14a–d (see FIGURES 1 and 2), indicating a physical movement of components in coin signal assembly 15, may be communicated from income totalizing device 1 to a conventional credit sensing device (not shown) via cable 9. Also, drive motor and reduction gear assembly 28 is energized when desired by an electrical potential developed in income totalizing device 1 via cable 9. The circuitry arrangements for achieving these and other results are hereinafter described in greater detail with reference to FIGURE 14.

*Income totalizing device—general operation*

The general operation of income totalizing device 1 is as follows: Each of the solenoids 18a, 18b, 18c, and 18d is adapted to be pulse energized for a relatively brief duration upon a signal that a coin of a given respective denomination has been received in the vending machine. For example, solenoids 18a, 18b, 18c, and 18d will be respectively pulse energized upon the receipt of dime, nickel, half-dollar, and quarter coins in a United States installation. The indicated solenoid energization will then cause a physical movement in coin signal assembly 15, which movement is reflected in computer assembly 22. In response thereto, the computer assembly 22 displays an output signal to activate drive motor and reduction gear assembly 28, which in turn signals back to computer assembly 22 via a gear arrangement so as to erase the original output signal which was developed therein by the action of coin signal assembly 15 and also so as to actuate counter assembly 30 in order to record the signalled coin value.

In FIGURE 2, computer assembly 22, solenoid assembly 18, and coin signal assembly 15 are shown in assembled operative relation in the previously noted environment defined by sidewalls 12a and 12b, intermediate channel plate 16, and top channel plate 24.

*Coin signal assembly*

Coin signal assembly 15 (see FIGURES 1 and 2) comprises four identical sub-assemblies 15a, 15b, 15c, and 15d corresponding respectively to solenoids 18a–d. For simplicity, only sub-assembly 15a will be described in detail, although in the ensuing description any individual component of any of the sub-assemblies 15a–d may be referred to by a corresponding reference numerical differentiated by the respective reference letters a, b, c, and d.

Thus, sub-assembly 15a comprises a solenoid plunger 19a, a crank lever 20a, and a signal pin 21a, which is a cylindrical member provided with a restricted diameter end portion 23a. The base of signal pin 21a of sub-assembly 15a is in the form of a yoke attached to the outermost extremity of crank lever 20a, and the base of solenoid plunger 19a is in the form of a yoke attached to crank lever 20a adjacent to signal pin 21a, as clearly shown in FIGURES 1 and 2.

A shaft 11 is disposed between top channel plate 24 and bottom channel plate 6 by alignment of its respective ends in aligned apertures 10t and 10b provided in channel plates 24 and 6 respectively. A retaining ring 31 supports a cylindrical plug member 13 on the bottom portion of shaft 11. Cylindrical plug member 13 comprises a restricted diameter bottom portion 13b and an enlarged diameter top portion 13t (see FIGURE 4). Plug member 13 supports a centrally disposed hollow cylindrical extension 44 of computer assembly 22. As shown in FIGURES 1 and 4, cylindrical extension 44 is provided with apertures 32 spaced 90 degrees apart to receive the respective fulcrum extensions 33a–d of the respective crank levers 20a–d. Detent pins 34a–d and U-shaped cam grooves 35a–d (see FIGURE 1) are provided in the respective fulcrum extensions 33a–d so that cam grooves 35a–d embrace enlarged diameter portion 13t of cylindrical plug member 13 while detent pins 34a–d lock crank levers 20a–d in engagement with cylindrical extension 44. Switches 14a–d (see FIGURES 1 and 2) are respectively positioned above crank levers 20a–d so that an upward movement of any of these crank levers will close its corresponding switch, for a purpose to be subsequently described.

In this fashion, energization of solenoid 18a will elevate solenoid plunger 19a, thereby rotating crank lever 20a upwardly as fulcrum extension 33a thereof bears against cylindrical plug member 13, and signal pin 21a is thus elevated. It should be observed that, as solenoid 18a is de-energized (thereby returning solenoid plunger 19a to its rest position), signal pin 21a likewise returns to its rest position, but at a somewhat slower rate than its rate of elevation. This slight time delay, for a purpose to be subsequently described, is achieved by virtue of the interaction of U-shaped cam groove 35a and cylindrical plug member 13, as the curved interior surface of cam groove 35a frictionally rides over the exterior contiguous surface of enlarged diameter portion 13t of cylindrical plug member 13. The respective subassemblies 15b–d each function in exactly the same fashion as does the described sub-assembly 15a.

Computer assembly

Computer assembly 22 comprises a housing 40, which in the described embodiment is defined by a bottom housing member 41 and a top housing member 42 which are rigidly secured together by bolt-and-nut assemblies 43. Bottom housing member 41 is integral with the previously described hollow cylindrical extension 44 which bears against cylindrical plug member 13. Housing 40 is mounted on a spring clip bearing 52 (see FIGURES 4 and 4A) which comprises an internal sleeve 51 and clip legs 51a and 52a. Clip legs 51a and 52a interlock with bottom housing member 41 as shown in FIGURE 4.

A spring 46, one end of which bears against a collar member 45 disposed on shaft 11 and the other end of which bears against the lowermost interior of cylindrical extension 44, normally retains housing 40 in its lowermost position abutting cylindrical plug member 13. Collar member 45 is urged upwardly by the force of spring 46 against a retaining ring 45a affixed to shaft 11. In this manner, housing 44 may be axially displaced relative to shaft 11 (i.e., upwardly in FIGURES 4 and 4A) by compression of spring 46.

Top housing member 42 is provided with roller grooves 49a and 49b spaced 180 degrees apart (see FIGURES 2, 3 and 5). Grooves 49a and 49b are defined by parallelly aligned L-shaped plates 47a and 48a for roller groove 49a and similar plates 47b and 48b for roller groove 49b. Grooves 49a and 49b are adapted to receive guide rollers 214a and 214b respectively, which rollers are affixed to the parallelly aligned sidewalls 12a and 12b respectively. In this manner, housing 40 is restrained from rotation relative to shaft 11, whereas the previously described axial displacement of housing 40 is not restricted.

Bottom housing member 41 is provided with four equidistant peripherally spaced cylindrical apertured flanges 36a–d which receive end portions 23a–d respectively of coin signal assembly 15. Recesses 37a–d are provided on top housing member 42 in corresponding alignment with the equidistant cylindrical flanges 36a–d. In this manner, elevation of a given end portion 23a–d (in response to energization of its corresponding solenoid as previously described) will cause the given end portion to move in a direction parallel to the axis of shaft 11 until it bears against the interior of top housing member 42 by engagement of the appropriate corresponding recess 37 such that the entire housing 40 is axially displaced upwardly, thereby compressing spring 46. After the brief pulse energization of the given solenoid, the given end portion 23 is gravity induced out of engagement with the corresponding internal recess 37 while spring 46 expands and forces housing 40 back to its rest position determined by abutment of cylindrical extension 44 with cylindrical plug member 13. Thus, pulse energization of a given solenoid responding to a predetermined coin value signal effects an up-and-down axial movement of housing 40. Alternatively, the same up-and-down axial movement can be equivalently achieved by shortening the respective end portions 23a–d such that signal pins 21a–d may themselves bear against the respective cylindrical flanges 36a–d to effect the desired displacement.

A coin determinative pawl actuator 50 is mounted for rotation with respect to shaft 11 by virtue of a rotative mounting of pawl actuator 50 about bearing 52 (i.e., the same bearing to which housing 40 is fixedly mounted for axial displacement with respect to shaft 11). A pawl torsion spring 53 is positioned in the annular recess surrounding sleeve 51 of bearing 52 and has one end affixed to bearing 52 (which is interlocked with bottom housing member 41) and has its other end affixed to pawl 50.

As best seen in FIGURE 8, pawl actuator 50 is provided with peripheral abutment stops 55–58. Abutment stop 55 is provided with a rear abutment stop portion 54, which is normally urged by the bias of torsion spring 53 to a rest position adjacent a rib 59 (see FIGURE 8) provided on the interior of bottom housing member 41. A recess 60 (see FIGURES 3 and 5) is provided on top housing member 42 to align with the upper portion of rib 59 as an aid in assuring proper alignment of top hosuing member 42 and bottom housing member 41. In this manner, coin determinative pawl actuator 50 may be rotated in a counterclockwise position (as indicated by the arrow in the FIGURE 8 orientation) by an impressed force, such that upon withdrawal of the force torsion spring 53 will rotate pawl actuator 50 in a clockwise direction until abutment stop 54 is again positioned adjacent rib 59, that is, until pawl actuator 50 returns to its initial given rest position relative to shaft 11 and housing 40.

Abutment stops 55–58 are located on the periphery of pawl actuator 50 in the following manner: When pawl actuator 50 is in the rest or normal position shown in FIGURE 8, the counterclockwise radial face of abutment stop 57 is adjacent a radial line running from the center of shaft 11 tangentially to the nearest extremity of end portion 23b, that is, abutment stop 57 is spaced from the closest extremity of end portion 23b by an angular separation of 0°. Similarly, abutment stop 56 is spaced from end portion 23a by an angular separation of 7.5°; abutment stop 55 is spaced from end portion 23b by an angular separation of 30°; and abutment stop 58 is spaced from end portion 23c by an angular separation of 67.5°. Obviously, elevation of any of the end portions 23 into the corresponding recesses 37 will limit the maximum angular counterclockwise rotation of pawl actuator 50. For example, if end portion 23a is elevated, pawl actuator 50 would be limited to a counterclockwise rotation of 7.5°. Similarly, end portion 23d would limit angular rotation to 30°, end portion 23c would limit angular rotation to 67.5°, and end portion 23b would limit angular rotation to 0°.

A ratchet wheel 61 is mounted for rotation with respect to shaft 11 and is positioned within housing 40 above pawl actuator 50 by a retaining ring 62 affixed to shaft 11, as best seen in FIGURES 4 and 4A. Thus, ratchet wheel 61 is mounted within housing 40 adjacent the top interior surface of top housing member 42. As shown in FIGURE 6, ratchet wheel 61 is provided with a top set of ratchet teeth 63 and with a bottom set of ratchet teeth 64, which teeth are staggered relative to each other by one-half the tooth separation of each set. In the described embodiment, 48 teeth are provided in each set to define an annular tooth separation of 7.5° and a set-to-set staggered relation of 3.75° (i.e., one-half of 7.5°).

A ratchet tooth pawl 65 (see FIGURE 4A and the schematic representation in FIGURE 6) is provided on the interior of top housing member 42 for engagement with top ratchet teeth 63. Similarly, a ratchet tooth pawl 66 (see FIGURES 4A and 8 and the schematic representation in FIGURE 6) is provided on the top side of coin determinative pawl actuator 50 for engagement with bottom ratchet teeth 64. As shown in FIGURE 4A and as schematically represented in FIGURE 6, pawl 65 is normally engaged with top ratchet teeth 63, where as pawl 66 is normally disengaged from bottom ratchet teeth 64. Pawls 65 and 66 are angularly spaced from each other relative to the shaft 11 by a full tooth angular increment of 7.5° in the described embodiment. If desired, more than one ratchet tooth pawl may be provided for engagement with the respective sets of ratchet teeth 63 and 64 so as to insure positive engagement, so long as additional pawls corresponding to the described pawls are spaced by a full tooth increment or an integral multiple thereof from the respective described pawls and from each other. However, for clarity, only the single pawls 65 and 66 have been illustrated.

Ratchet wheel 61 is provided with an upwardly extending centrally disposed cylindrical flange 67 which is cut away at 68 to provide a circumferential key lock (see FIGURE 9). A cam member 71 is provided with a corresponding cylindrical flange 69 which is cut away at 70 to provide a key lock engagement with cylindrical flange 67 of ratchet wheel 61.

Cam member 71 comprises an annular ring 72 joined to a cylindrical flange 69 by a web portion 73 so as to define an annular recess 74 between ring 72 and flange 69.

A gear member 75, which has an inner and upper annular recess 76 and an outer and lower annular recess 77, is sandwiched between ratchet wheel 61 and cam member 71. A retaining ring 78 is affixed to shaft 11 above cam member 71, and retaining ring 78 and previously described retaining ring 62 below ratchet wheel 61 maintain cam member 71 and the ratchet wheel 61 in keyed engagement, with gear member 75 sandwiched therebetween by the intermesh of an internal flange 79 of gear member 75 within annular recess 74 of cam member 71 and correspondingly by the intermesh of annular ring 72 of cam member 71 within annular recess 76 of the gear member 75.

A torsion ratchet drive spring 80 having one end affixed to gear member 75 and having its other end affixed to ratchet wheel 61 provides the motive force for rotation of ratchet wheel 61, as hereinafter described.

Gear member 75 is provided with a set of driven gear teeth 81 and a set of driving gear teeth 82. Gear member 75 is also provided with a set of one-way rotation ratchet teeth 83. A ring shaped retaining pawl member 84, having peripheral cup elements 85 and 86 (see FIGURES 2 and 4A), is mounted on studs 87 and 88 that depend from top channel plate 24. Pawl member 84 is provided with tooth pawls 89 on its underside for engagement with ratchet teeth 83 of gear member 75. Springs 90 and 91, which are mounted about studs 87 and 88 respectively between top channel plate 24 and the respective cup elements 85 and 86, urge pawl member 84 downwardly against gear member 75, such that tooth pawls 89 engage ratchet teeth 83 to allow one-way rotation only for gear member 75 (i.e., to the right as indicated by the arrow in FIGURE 2). The allowable direction of rotation for gear member 75 is chosen so as to wind torsion spring 80, thereby storing energy for relative movement between ratchet wheel 61 and gear member 75, in a manner to be subsequently described.

*Switch actuator and cam assembly*

A switch actuator 92 is rotatively mounted on shaft 11 above lock washer 78 and beneath a collar member 93, which bears against a retaining ring 97 affixed to shaft 11. Switch actuator 92 comprises a cylindrical base portion 94 having a cylindrical disc portion 95 extending therefrom. An expansion spring 96 which encompasses cylindrical base portion 94 bears at its one end against the top side of cylindrical disc portion 95 and at its other end at the underside of collar member 93, thereby urging switch actuator 92 downwardly toward lock washer 78.

Cam member 71 is provided with inclined cam portions 98 and 99 (see FIGURES 7 and 9–11) 180° apart on the exterior of annular ring 72. Lugs 100 and 101 depend from the underside of cylindrical disc portion 95 of switch actuator 92 and are likewise spaced 180° apart. Ribs 102 and 103 are provided 180° apart in annular recess 76 of gear member 75 adjacent the outermost surface of recess 76 (as best seen in FIGURES 7 and 9).

In this manner, switch actuator 92 is elevated against the force of spring 96 (as shown in FIGURE 11) when cam member 71 is at the proper angular orientation with respect to gear member 75 such that lug 101 of switch actuator 92 will be embraced between rib 103 of gear member 75 and the upper face of inclined cam portion 99 of cam member 71 and correspondingly such that lug 100 of switch actuator 92 will be embraced between rib 102 of gear member 75 and the upper face of inclined cam portion 98 of cam member 71.

Switch assembly 105 (see FIGURES 9–11), which functions as a reverse action contact switch, comprises a support frame 106 (mounted on top channel plate 24) and a Z-bar 107, an L-bar 108, and a contact point 109, each mounted on the frame 106 and depending therefrom. A lever 110 is carried by L-bar 108 and has one end 113 overlying disc portion 95 of switch actuator 92 and its other end 114 engaged in end 116 of a spring clip 111. Spring clip 111 is also carried by L-bar 108 and has a central distended portion 112 which imparts resiliency to spring clip 111. A contact point 115 is carried on the other end 117 of clip 111 and is aligned with contact point 109 mounted on frame 106.

The operation of the switch assembly 105 is as follows: When switch actuator 92 is in its depressed position shown in FIGURE 10, lever 110 is extended downwardly and clip 111 is flexed such that contact points 109 and 115 are touching, thereby making electrical contact. When, however, switch actuator 92 is in its elevated position shown in FIGURE 11, lever 110 is extended upwardly pivoting about L-bar 108 as a fulcrum and thereby flexing end 117 of clip 111 away from frame 106 so as to break the electrical contact between contact points 109 and 115. In this manner, a closed-circuit electrical signal is generated when switch actuator 92 is down, and correspondingly an opened-circuit electrical signal is generated when switch actuator 92 is up.

*Details of operation*

The operation of the described income totalizing device 1 when equipped with a United States coin determinative pawl actuator 50 is as follows: When for example a dime coin is inserted in a coin vending machine, an appropriate electrical pulse signal is transmitted to solenoid 18a via electrical cable 9. Pulse energization of solenoid 18a causes solenoid plunger 19a to be momentarily elevated, thereby forcing end portion 23a of signal pin 21a upwardly into ratchet housing 40. As the furthest extreme of end portion 23a engages the interior surface of recess 37a provided in top ratchet housing member 42, ratchet housing 40 is axially displaced relative to shaft 11, thereby compressing spring 46. When ratchet housing 40 is thus elevated, ratchet tooth pawl 65 provided on the interior of top ratchet housing member 42 is freed from engagement with top ratchet teeth 63 of ratchet wheel 61. Simultaneously, ratchet tooth pawl 66 provided on the top surface of coin determinative pawl actuator 50 is brought into engagement with bottom ratchet teeth 64 of ratchet wheel 61.

As housing 40 is thus freed from ratchet wheel 61 (i.e., as pawl 65 escapes from teeth 63), ratchet wheel 61 first rotates by a half-tooth increment or 3.75° into engaged relationship with pawl actuator 40 (i.e., pawl 66 engages teeth 64) by virtue of expansion of ratchet drive spring 80. Ratchet wheel 61 and intermeshed pawl actuator 50 will then continue to rotate against the force of pawl torsion spring 53 (which normally restrains pawl actuator 50) for 7.5° until abutment stop 56 strikes the upwardly extended end portion 23a, thereby preventing further rotation of pawl actuator 50 and therefore further rotation of ratchet wheel 61 engaged therewith. When, however, solenoid 18a is de-energized, ratchet tooth pawl 66 is withdrawn from engagement with ratchet teeth 64 and ratchet tooth pawl 65 is simultaneously brought back into engagement with ratchet teeth 63, as end portion 23a is withdrawn from the path of abutment stop 56 (i.e., as ratchet housing 40 is returned to its normal rest position by expansion of ratchet housing spring 46). Ratchet wheel 61, which has now been freed from engagement with pawl actuator 50, will continue to rotate an additional half-tooth increment or 3.75° (under the influence of expanding ratchet drive spring 80) until tooth pawl 65 of top ratchet housing member 42 again positively engages the next adjacent tooth of ratchet teeth 63, while pawl actuator 50 returns to its normally biased rest position shown in FIGURE 8 under the influence of pawl torsion spring 53.

Thus, it is apparent that ratchet wheel 61 will rotate by an initial half-tooth increment as ratchet tooth pawl 65 is withdrawn and ratchet tooth pawl 66 is placed into engagement with ratchet wheel 61. Similarly, ratchet wheel 61 will rotate by a final half-tooth increment as ratchet tooth pawl 66 is withdrawn from engagement with teeth 63. Abutment stop 56 is rest positioned relative to end portion 23a by an angular increment of 7.5°, which in the described embodiment is equivalent to a full tooth angular separation for ratchet wheel 61, so that ratchet wheel 61 exhibits an initial half-tooth, an intermediate full tooth, and a final half-tooth or a total of two full teeth or 15° of angular rotation.

If a quarter coin is inserted, essentially the same sequence of operation is observed, that is, an initial half-tooth increment of rotation of ratchet wheel 61 as it is freed from engagement with tooth pawl 65 of top ratchet housing member 42; an additional intermediate amount of rotation of ratchet wheel 61 combined with pawl actuator 50 by engagement of tooth pawl 66 in bottom ratchet teeth 64 until abutment stop 55 is impeded by end portion 23d; and a final half-tooth increment of rotation of the free ratchet wheel 61 until it is again engaged by tooth pawl 65 of top ratchet housing member 42. In this instance, the intermediate rotation of the combined ratchet wheel 61 and pawl actuator 50 constitutes the equivalent of four full teeth or 30° of angular rotation so as to yield a total of five full teeth or 37.5° of ratchet wheel angular rotation.

Insertion of a half-dollar coin results in a similar operation, and in this instance the intermediate rotation until abutment stop 58 is impeded by end portion 23c constitutes the equivalent of nine full teeth or 67.5° of angular rotation or a total of ten full teeth of 75° of ratchet wheel angular rotation.

When a nickel coin is inserted so as to actuate end portion 23b, no intermediate rotation will be exhibited since abutment stop 57 is immediately impeded by end portion 23b; however, the initial and final half-tooth increments of 3.75° of rotation each for ratchet wheel 61 will nonetheless be exhibited, even though pawl actuator 50 remains stationary in its rest position. Thus, a nickel coin insertion results in a total of one full tooth or 7.5° of ratchet wheel angular rotation.

It should be apparent that the described operation results in an angular rotation of ratchet wheel 61 for the equivalent of one, two, five, or ten full-teeth of angular rotation or stated alternatively of 7.5°, 15° 37.5°, or 75° of rotation depending upon the energization respectively of solenoids 18b, 18a, 18d, and 18c. As hereinafter described, these increments of angular rotation are translated into proportionate motion of drive gear 75, the rotation of which in turn proportionately activates counter assembly 30.

It should also be apparent that a slightly modified arrangement could be utilized to achieve the same result. Thus, top ratchet teeth 63 and bottom ratchet teeth 64 of ratchet wheel 61 could be aligned instead of the half-tooth staggered relation shown in FIGURE 7; either one of tooth pawls 65 or 66 could be shifted relative to the other by a half-tooth or a 3.75° angular increment; and the rest position of pawl actuator 50 could be shifted clockwise (from the FIGURE 8 disposition) by a full tooth or a 7.5° angular increment by appropriate repositioning of rib 59. In this manner, the described initial and final half-tooth increments of rotation of ratchet wheel 61 by the mere axial displacement and replacement of housing 40 would be eliminated, and the rotation of ratchet wheel 61 would be determined strictly by the position of pawl actuator 50, as in the intermediate rotation previously described. Although the same 1:2:5:10 ratio of angular increments for ratchet wheel 61 could thus be exhibited by an aligned tooth arrangement, the staggered tooth arrangement is preferred in that it insures positive non-jamming functioning of the apparatus and eliminates any possibility of ratchet wheel 61 slip rotating by an unwarranted tooth increment as tooth pawls 65 and 66 are alternatively engaged and withdrawn from ratchet wheel 61.

As a further safety feature to insure a complete accuracy of operation, the previously described time delay cooperation of cam groove 35 with cylindrical plug member 13 prevents withdrawal of any of end portions 23 from the path of the respective abutment stops 55–58 of pawl actuator 50 until ratchet tooth pawl 65 of top ratchet housing member 42 is positively seated in engagement with top ratchet teeth 63 of ratchet wheel 61, so as to insure that no unwarranted rotation of ratchet wheel 61 will occur.

As ratchet wheel 61 thus rotates relative to the temporarily stationary gear member 75, cam member 71, keyed to ratchet wheel 61, likewise rotates by a corresponding degree. This rotation of cam member 71 relative to gear member 75 withdraws inclined cam portions 98 and 99 of cam member 71 from their rest positions shown in FIGURE 11 adjacent ribs 102 and 103 respectively of gear member 75. Switch actuator spring 96 is then free to force switch actuator 92 downwardly toward gear member 75 since lugs 100 and 101 are no longer impeded by the cooperation of inclined cam portions 98 and 99 with ribs 102 and 103.

As switch actuator 92 is thus displaced downwardly to the FIGURE 10 position, switch assembly 105 goes to a closed circuit position in conjunction with circuitry hereinafter described so as to rotate motor drive gear 27g which engages driven gear teeth 81 of gear member 75 and causes gear member 75 to rotate in the same direction of rotation as is exhibited by ratchet wheel 61. Rotation of gear member 75 re-winds ratchet wheel drive spring 80, thereby storing energy for subsequent motive power to be imparted to ratchet wheel 61. When gear member 75 rotates by the same amount of rotation as did ratchet wheel 61, ribs 102 and 103 will again be positioned relative to cam member 71 to force switch actuator 92 upwardly against the force of switch actuator spring 96 thereby open-circuiting switch assembly 105 so as to de-energize drive motor and reduction gear assembly 28.

Thus, by virtue of the cooperation between cam member 71, gear member 75, and switch actuator 92, gear member 75 will be caused to rotate by the same amount as ratchet wheel 61 was caused to rotate. Simultaneously, ratchet wheel drive spring 80 will be rewound for the next rotative movement of ratchet wheel 61.

Additionally, in response to rotation of gear member 75, driving gear teeth 82 thereof will cause a corresponding proportional rotation of counter gear 29g, thereby registering a calibrated coin value increase in counter mechanism 30.

Thus, the basic feature of operation in accordance with the subject invention is that positioning of pawl actuator 50 by a fixed and predetermined amount by the value of the credit signal received is translated into a positioning of ratchet wheel 61 determined by the positioning of pawl actuator 50. The indicated positioning of ratchet wheel 61 is then translated into a suitable registration or recordation of the signaled credit value.

The preferred approach for obtaining the latter translation is to cause gear member 75 to rotate correspondingly to ratchet wheel 61. In the embodiment disclosed herein, gear member 75 rotates in the same direction and to the same extent as ratchet wheel 61, that is, gear member 75 is adapted to track and follow the rotation of ratchet wheel 61, and movement of gear member 75 is then translated into a counter mechanism recordation so as to indicate and record the denomination of the signal coin value.

The preferred income totalizing unit described herein is provided with an inherent anti-jamming feature by virtue of the above-described mode of operation. For instance, suppose that two coins are inserted in rapid succession into a vending machine to which an income totalizing device 1 of the type described is attached. The spring driven positioning of ratchet wheel 61, being relatively rapid, readily absorbs the successive coin signal pulses and fixes the position of ratchet wheel 61 at a rotated distance corresponding to the cumulative sum of the two coins from its rest or start position. However, the actual value indication of the counter assembly, being gear driven, exhibits a slower response, and obviously, if a coin signal were delivered directly to a gear train arrangement, it is possible that the second successive coin value would be lost. Since the value indicated in counter assembly 30 is ultimately determined by the degree of rotation of gear member 75, ratchet wheel 61 may advance in successive increments at its own relatively rapid rate, and gear member 75 will eventually follow ratchet wheel 61, although at a slower rate, until the same original relative disposition is achieved as in the start or rest position. Thus, ratchet wheel 61 always rotates from a rest position (in which position switch actuator 92 is elevated) relative to gear member 75 in the same direction in incremental amounts proportionate to the signalled coin value, as sensed by coin determinative pawl actuator 50. Likewise, gear member 75 tracks and follows ratchet wheel 61, although at a slower rate, until the initial relative disposition with switch actuator 92 elevated is again achieved.

*Currency modifications*

The basic principles of coin determinative pawl actuator 50 shown in FIGURE 8 can also be utilized for other relative coin values than the described nickel, dime, quarter, and half-dollar sequence of the United States currency system. By proper angular proportioning of the abutment stops, any coin system can be sensed by such a pawl actuator. However, it is known that most of the coin currency systems in use today are predicated upon one or the other of the United States 1:2:5:10, the Netherlands 1:2.5:10, and the English 1:2:4:8 relative values. Thus, a unique advantage of the preferred device described herein is that, by the mere substitution of a modified pawl actuator, of an appropriately calibrated counter, and of suitably modified circuitry, the said device is readily adapted for income totalizing of most foreign currencies, even though any coin system could be accommodated by appropriate design.

For example, a pawl actuator 50N (such as shown in FIGURE 12) in conjunction with a 48 teeth ratchet wheel 61 would be sensitive to the Netherlands coin system of 1:2.5:10 relative proportions for the ten cent, twenty-five cent, and guilder coins thereof. Thus, abutment stops 56N, 55N, and 57N allow respectively 7.5°, 30°, and 142.5° of angular rotation for pawl actuator 50N from the rest position defined by the adjacent contacting of abutment stop portion 54N with rib 59N. Since each coin signal allows a fixed ratchet wheel rotation of 7.5° (i.e., an initial and final 3.75° of half-tooth rotation in a staggered tooth ratchet wheel), a ratchet wheel 61 combined with a pawl actuator 50N can exhibit upon appropriate signal 15°, 37.5°, or 150° of rotation, which defines the desired 1:2.5:10 relative proportions.

Similarly, a pawl actuator 50E (suc has shown in FIGURE 13) would be sensitive to the English coin system of 1:2:4:8 relative proportions for the three pence, six pence, shilling, and florin (two shilling) coins thereof. Thus, abutment stops 57E, 56E, 55E, and 58E allow respectively 0°, 7.5°, 22.5°, and 52.5° of rotation for pawl actuator 50E from the rest position defined by the adjacent contacting of abutment stop portion 54E with rib 59E. Again, by virtue of the fixed ratchet wheel rotation of 7.5° upon each coin signal, a ratchet wheel 61 combined with a pawl actuator 50E can exhibit upon appropriate signal 7.5°, 15°, 30°, or 60° of rotation, which defines the desired 1:2:4:8 relative proportions.

It should again be emphasized that the coin determinative pawl actuator arrangements shown in FIGURES 8, 12 and 13 are merely illustrative of a preferred approach to the practice of the subject invention. While many varying approaches will be apparent to those skilled in the art, some generalizations may be observed with respect to the rotary-type pawl actuator disclosed herein. Thus, if a ratchet wheel is utilized with a greater or lesser number of teeth than the described 48 teeth ratchet wheel, the abutment stops of the rotary-type pawl actuator would have to be angularly repositioned proportionately. One may use the following generalities in designing a rotary-type pawl actuator of the preferred embodiment disclosed herein. For coin values having relative proportions of $C_1:C_2:C_3:C_4$ and for half-tooth staggered sets of ratchet wheel teeth having $n$ teeth in each set at an angular separation of $(360/n)°$, the $C_1$, $C_2$, $C_3$, and $C_4$ pawl actuator abutment stops should rest respectively $(w \cdot 360/n)°$, $x°$, $y°$, and $z°$ from the respective $C_1$, $C_2$, $C_3$, and $C_4$ impeding end portions, where:

$$x = (360/n)[C_2/C_1(1+w)-1]$$
$$y = (360/n)[C_3/C_1(1+w)-1]$$
$$z = (360/n)[C_4/C_1(1+w)-1]$$

and $w$ = the smallest integer (i.e., 0, 1, 2 . . . ) for which each of the products $[(C_2/C_1)(w)]$; $[C_3/C_1)(1+w)]$; and $[(C_4/C_1)(1+w)]$ will be an integer Thus, in the cases of the United States and the English coins systems previously described $w=0$, whereas in the Netherlands coin system $w=1$.

Similarly, if a ratchet wheel with aligned non-staggered upper and lower teeth is utilized such that a coin determinative pawl actuator directly controls the ratchet wheel rotation without the initial and final incremental rotations thereof, as previously described, the $C_1$, $C_2$, $C_3$, and $C_4$ abutment stops should rest respectively $(w' \cdot 360/n)°$, $x'°$, $y'°$, and $z'°$ from the respective impending $C_1$, $C_2$, $C_3$, and $C_4$ end portions, where:

$$x' = (360/n)(C_2/C_1)(1+w)$$
$$y' = (360/n)(C_3/C_1)(1+w)$$
$$z' = (360/n)(C_4/C_1)(1+w)$$

and $w'$ = the smallest interger (i.e., 0, 1, 2 . . . ) for which each of the products $[(C_2/C_1)(1+w')]$; $[(C_3/C_1)(1+w')]$; and $[(C_4/C_1)(1+w')]$ will be an integer

*Circuitry*

Electrical circuitry designed for use with the described income totalizing device is schematically shown in FIGURE 14. The circuitry comprises two inter-related sub-circuits, namely, the counter subcircuit 700 and the remote unit subcircuit 701.

A socket 604 provides the basic alternating current power for the circuitry across terminals T1 and T5 thereof, as by reception of a mating plug 604', corresponding terminals T1' and T5' of which are connected to a suitable alternating current power source P. Schematic leads a–1 perform no function in the income totalizing device as such (other than to supply the alternating current power thereto, across terminals 1 and 5 of socket 604 as indicated) but are merely run through the device from the respective terminals T1′–T12′ of plug 604′ to the respective terminals T1–T12 of socket 604 as a safety and anti-cheating feature. For instance, in an actual physical embodiment, if a cable (corresponding to electrical connection cable 9 in the previously described physical embodiment) connecting the income totalizing device with the main vending unit is inadvertently or intentionally tampered with such that the power supply to the totalizer is cut off, the power supply to the various components of the main vending unit (as carried by the schematic leads a–1) would likewise be cut off.

Counter subcircuit 700 comprises a main unit coin input socket 600 and a main unit credit output socket 601. Socket 600 is provided with ground, nickel, dime, quarter, and half-dollar terminals respectively indicated by G, N, D, Q, and H. Similarly, socket 601 is provided with corresponding terminals indicated by G″, N″, D″, Q″, and H″.

A lead m extends from terminal T5 of socket 604, and a lead n interconnects terminal T1 of socket 604 with a ground terminal G of the socket 600. A drive motor M and its series motor switch MS (which correspond respectively to the drive motor of assembly 28 and to switch 105 of the previously described physical embodiment) are connected between leads m and n via ground terminal G of socket 600 such that closure of switch MS energizes motor M with the full alternating current potential of power source P. A signal lamp L and its series resistor R2 are connected in parallel across motor M, such that energization of motor M results in a corresponding illumination of lamp L. Coin signal solenoids RN1, RD1, RQ1 and RH1 are respectively connected between lead m and the corresponding terminals N, D, Q, and H of socket 600. Coin signal solenoids RH1, RD1, RQ1, and RH1 correspond to solenoids 23b, 23a, 23d, and 23c shown in the previously described physical embodiment. A suitable plug (not shown) is received in socket 600 such that reception of a nickel, a dime, a quarter, and a half-dollar in a main coin receiving mechanism will trip switches to respectively interconnect terminals N–G; D–G; Q–G; and H–G of socket 600, whereby nickel solenoid RN¹, dime solenoid RD¹, quarter solenoid RQ1, and half-dollar solenoid RH1 will be energized in response respectively to the reception of nickels, dimes, quarters, and half-dollars.

Relay switches SN1, SD1, SQ1, and SH1 (which are respectively associated with coin signal solenoids RN1, RD1, RQ1, and RH1) are respectively connected between lead o and respective terminals N″, D″, Q″, and H″ of socket 601. These switches correspond respectively to switches 14b, 14a, 14d, and 14c shown in the previously described physical embodiment. A suitable plug (not shown) is received in socket 601 such that appropriate potentials across terminals N″–G″, D″–G″, Q″–G″, and H″–G″ will respectively record nickel, dime, quarter, and half-dollar credit values in a suitable credit sensing mechanism (not shown). These indicated potentials are developed in the circuitry in a manner to be subsequently described.

Remote unit subcircuit 701 comprises a remote unit coin signal input socket 602, a time delay system 603, a thermal protector system TP, and remote unit nickel, dime, and quarter coin signal solenoids RN2, RD2, and RQ2, with their respective associated dual relay switches SN2, S3; SD2, S4; and SQ2, S5. A lead m′ (which is connected to lead m and thus to terminal T5 of socket 604) is connected to one side of thermal protector system TP, and a lead m″ is connected to the other side thereof. Coin signal solenoids RN2, RD2, and RQ2 are respectively connected between lead m″ and the respective terminals N′, D′, and Q′ of socket 602. A suitable plug (not shown) is received in socket 602 such that reception of a nickel, a dime, and a quarter in a remote coin receiving unit will trip switches to respectively interconnect terminals N′–G′, D′–G′, and Q′–G′, whereby the respective solenoids RN2, RD2, and RQ2 will be correspondingly energized. Furthermore, the plug received in socket 602 is also connected to a remote unit credit sensing mechanism (not shown), for a purpose to be subsequently described.

Time delay system 603 comprises the series combination of: a diode rectifier D1 and a series current limiting resistor R5; switches S3, S4, and S5; and a time delay series resistor R1 and a capacitor C1, which series combination is connected between lead m″ and lead o′, so as to impress the potential of power source P thereacross. Time delay system 603 further comprises a time delay relay RTD, which is connected between the normally open-circuited lead q and lead o′. A capacitor C2 is connected in parallel with relay RTD, and a switch S6 is associated with relay RTD.

Switches SN2, SD2, and SQ2 are normally open-circuited. However, each of the said switches, when closed by its associated relay, is connected between lead p and the respective terminals N, D, and Q of socket 600.

Thermal protector system TP comprises a resistor R3 in parallel with the series combination of a resistor R4 and a contact point CP of a bimetallic switch blade element. When subcircuit 701 malfunctions so as to overheat, resistors R4 and R3 will cause the thermally sensitive switch blade element to open-circuit contact point CP, in a well-known manner.

The operation of the described circuitry may be illustrated by consideration of the electrical events attendant to the insertion of a nickel in the main vending unit (i.e., subcircuit 700) and also to the insertion of a nickel in the remote vending unit (i.e., subcircuit 701). When a nickel is inserted in the main vending unit, coin signal solenoid RN1 is energized so as to initiate a series of mechanical events in the previously described income totalizing device which includes closure of the respective switches SN1 and MS. Switch MS remains closed for a finite duration proportionate to the coin value signalled, since switch MS will close when the given angular disposition of ratchet wheel 61 and gear member 75 is disturbed and will remain closed until that disposition is again achieved by virtue of gear member 75 tracking and following ratchet wheel 61.

Motor M is likewise energized for the same corresponding finite duration so as to mechanically totalize a nickel value in the coin registry system of the income totalizing device. Lamp L, in parallel with the motor M, is likewise illuminated for the same finite duration. Closure of switch SN1 establishes a nickel credit in the credit sensing mechanism by impressing the potential N″–G″ across credit socket 601, since lead o connects to terminal G″ via switch S6, lead o′, and terminal G of socket 600. Similarly, insertion of a dime, a quarter, or a half-dollar will initiate corresponding events differing only in the credit established and in the proportionately longer finite duration of time that motor M and its attendant signal lamp L are energized. Since the respective finite durations for energization of motor M will be proportional to the coin values signalled (as previously described in the mechanical description of the income totalizing device), it is apparent that signal lamp L will continuously indicate whether the income totalizing device is properly functioning. In other words, the duration of illumination for lamp L is directly proportional to the coin value signalled, and the proprietor of an establishment in which a vending machine having an income totalizing device as described herein is installed is thus enabled to readily detect whether or not each insertion of a given coin is registering the proper income totalization in the counter mechanism of the income totalizing device, without a detailed or individualized reference to the specific coin registry indicia. For this purpose, lamp L may be conveniently located for appropriate visual inspection by the proprietor.

The operation of the remote unit subcircuit 701 is slightly more complicated. When a nickel is received in a remote unit, solenoid RN2 is energized, whereby each of switches SN2 and S3 are lowered from the positions shown in FIGURE 14. When switch S3 is lowered, relay RTD is energized as hereinafter described so as to lower its associated switch S6 from the position shown in FIGURE 14. The said lowering of switch S6 performs two functions: First, lead *o* is open-circuited such that credit will not be established in credit socket 601 of subcircuit 700, and, second, lead *p* is connected through closed switch S6 to terminal G of main unit coin input socket 600 such that a potential is impressed across terminals N and G of socket 600 through lowered switch SN2. Obviously, this potential is equivalent to the potential achieved by the insertion of a nickel into the main vending unit, and solenoid RN1 will be correspondingly energized, so that the mechanical income totalization procedure may be effected, without however establishing any credit by virtue of the closure of switch SN1 associated with coin signal solenoid RN1, since lead *o* is now open-circuited.

When switch S3, associated with solenoid RN2, is in its elevated position shown in FIGURE 14, rectified direct current is impressed across the series combination of resistor R1 and capacitor C1. When switch S3 is lowered from the position shown in FIGURE 14, the series combination of resistor R1 and capacitor C1 is connected in parallel with time delay relay RTD and with its parallel capacitor C2. Capacitor C2 will thus exhibit a time delay discharge in a well known manner such that time delay relay RTD will be retained in an energized state for a finite duration even after switch S3 returns to its elevated rest position by virtue of de-energization of coin signal solenoid RN2. This time delay action insures that switch S6 will remain in its lowered position (so as to open-circuit lead *o*) in order for the nickel value to be recorded in the coin registry of the income totalizing device without a corresponding register of a nickel value in the credit sensing mechanism.

Depending on the transient characteristics of an actual circuit, it may be necessary to provide a further mechanical time delay feature for switch S6, such that it exhibits a brief neutral position between its depressed condition contacting lead *p* and its elevated position contacting lead *o* in order that switch SN1 will be definitely opened before switch S6 contacts lead *o*.

The reason for this time delay arrangement in a remote unit is predicated upon the exigencies of a commercial phonograph vending unit installation including remote units. The remote units are provided with separate and independent credit sensing mechanisms for each unit, for otherwise a user might find that he had deposited coins in a remote unit only to establish credit in the main unit or in other remote units which credit could be misused by another party waiting for the opportunity to select a given musical number before the actual depositor of coins has had the opportunity to do so. Thus, the circuitry of the income totalizing device is designed to display appropriate coin signals for totalizing of coin values whether the coins are deposited in the main vending unit or in any of a number of remote vending units. However, since each of the main and the remote vending units is provided with an independent credit sensing mechanism, only coins deposited in the main vending unit will register credit in the credit sensing mechanism thereof, while coins deposited in the remote vending units will in all respects behave as coins deposited in the main vending unit without however registering any credit in the credit sensing mechanism of the main vending unit.

*Recording income totalizing device—general description*

FIGURE 15 illustrates an exemplary recording income totalizing device 812 produced in accordance with the subject invention. Device 812 comprises a front wall 813 and a rear wall 814 interconnected by a plurality of brackets (hereinafter to be described) and mounted on a base plate 815. While front wall 813 is formed of a plurality of partially overlapping plates 813A, 813B, and 813C, it may also be formed in one piece. In a similar manner, rear wall 814 comprises a plurality of partially overlapping plates 814A, 814B, and 814C but may also be formed in one piece.

An income totalizing mechanism 816 (shown schematically in broken lines in FIGURE 1) is mounted between front wall 813 and read wall 814. Income totalizing mechanism 816 is generally similar to the device 1 disclosed in FIGURES 1–14 and described above (with certain exceptions hereinafter specifically noted), and accordingly mechanism 816 will only briefly be described.

As shown in FIGURE 15, income totalizing mechanism 816 utilizes a ratchet wheel and a coin determinative pawl actuator which are co-axially mounted for rotation in a frame housing 817 about a shaft 818. Neither the ratchet nor the pawl actuator are illustrated in FIGURES 15–25, as these elements are identical to ratchet wheel 61 and pawl actuator 50, of previously described device 1. Means, including the coin determinative pawl actuator, are provided for effecting rotation of the ratchet wheel by a predetermined degree of angular displacement in response to a coin signal selectively determined by the value of an inserted coin and for transforming the angular displacement of the ratchet wheel into angular movement of a gear member 819, which is also co-axially mounted for rotation about shaft 818.

As previously indicated, angular displacement of the ratchet wheel is determined by angular displacement of the coin determinative pawl actuator, and the transformation of the ratchet wheel rotation into movement of gear 819 is achieved as follows. Movement of the ratchet wheel relative to the temporarily stationary gear 819 effects the energization of a motor 820 (shown schematically in FIGURES 16 and 17), thereby causing a motor drive gear 821 to rotate. The teeth of motor drive gear 821 engage a set of driven teeth 822 on gear 819, thereby causing gear 819 to undergo rotation. Gear 819 rotates until it undergoes angular rotation equivalent to that previously undergone by the ratchet wheel. When this occurs, motor 821 is de-energized, thereby stopping the rotation of gear 819.

In addition to the indicated driven teeth 822 on gear 819, a set of driving teeth 823 are also provided thereon. A gear 824 is mounted for rotation on a shaft 825 (see FIGURE 15) which is journaled for rotation in a bracket 828 fastened between front wall 813 and rear wall 814 of recording income totalizing device 812. Gear 824 engages driving teeth 823 on gear 819, whereby rotation of gear 819 causes gear 824 to undergo rotation. A second gear 826 (see FIGURE 16) is also mounted co-axially with gear 824 for rotation about shaft 825, and a plurality of ratchet teeth are formed on adjacent faces of gears 824, 826 (the respective sets of ratchet teeth being indicated generally at 827 in FIGURE 16) such that, when gear 824 is rotatably driven by driving teeth 823 on gear 819, gear 826 is also driven.

A frame 831 (see FIGURE 25) of a conventional gear driven counting meter 832 is mounted between a pair of brackets 833, 834 which are mounted between front wall 813 and rear wall 814 of device 812. Counting meter 832 comprises a shaft 835 which is journaled for rotation in frame 831. A plurality of discs 836 are mounted on shaft 835, and discs 836 sequentially rotate with shaft 830 so as to register, in a conventional manner, the extent of rotation of shaft 835. For example, suitable indicia, such as numerals, may be provided on the respective discs 836 so that a numerical value corresponding to the number of revolutions shaft 835 has undergone will be displayed.

A gear 837 is mounted on shaft 835 for rotation therewith, and the teeth on gear 837 are adapted to engage the teeth on gear 826, whereby rotation of the latter imparts rotation to the former, and hence to shaft 835. Thus, when gear 819 is permitted to undergo angular motion of a predetermined angular increment (as determined by a like movement of the ratchet wheel within housing 817), driving teeth 823 of gear 819 drive gear 824, which advances gear 826, which in turn drives gear 837 and shaft 835. Accordingly, the rotation undergone by shaft 835 is proportionate to the incremental angular movement of the ratchet wheel. In this manner, the rotation of shaft 835 is proportionate to the value of coins deposited in the coin sensitive mechanism, since totalizer mechanism 816 is adapted to cause the ratchet wheel (and hence shaft 835) to undergo different predetermined increments of angular rotation in response to the deposit of coins of different value, in the manner heretofore indicated. Thus, the numerals on discs 836 may be calibrated to read an accumulated value total for the deposited coins.

All of the foregoing is by way of a brief general summary of the structure and operation of income totalizing mechanism 816, corresponding to the previous description of device 1 with reference ot FIGURES 1–14. However, totalizing device 1 provides for visual observation of numerals on the discs of a counting meter by a routeman (i.e., the total accumulated coin value at any given time is read from the discs). A potential disadvantage that is inherenet in such an arrangement is that no permanent record of the coin value at any given time can be preserved without the routeman recording the value by hand. Of course, such manual recording involves the possibility of errors, both fraudulent and accidental, such as improper transcription of figures.

In order to provide a permanent recording or printing feature for the subject invention, the previously described counting meter 832 provided in totalizing mechanism 816 is modified slightly in comparison to the conventional counter meter disclosed above with reference to device 1. Since the previously described device 1 contemplates visual observation of the total value registered on a meter, the indicia numerals are merely printed or otherwise marked on the recording discs. However, in accordance with a further aspect of the present invention, the numerals on discs 836 are raised above the respective surfaces thereof and serve as printing dies for permanently recording the numbers registered by counting meter 832. The raised numerals on discs 836 are indicated at 836′ in FIGURES 16 and 20. Thus, the subject invention provides an income totalizing mechanism 812 adapted to provide a permanent printed record of the accumulated coin value registered therein.

A horizontally disposed plate 841, provided with an opening 842 (see FIGURES 16 and 20), is fixed between front wall 813 and rear wall 814 of device 812 so that a row of raised numerals on discs 836 projects upwardly through opening 842. A slot 843 is provided in front wall 813 of device 812, and the lower edge of slot 843 is disposed in approximately the same horizontal plane as the top surface of plate 841. Thus, when a data recording form (hereinafter described) is inserted through slot 843 in front wall 813, the said form may be disposed on plate 841 and over opening 842 through which raised numerals 836′ project, so that when a platen roller assembly 860 (hereinafter described in detail) is passed thereover, the form is pressed against the exposed numerals 836′.

Normally, slot 843 and front wall 813 are substantially covered by a shutter 844 (see FIGURE 24), the structure and function of which will be hereinafter described in detail. However, shutter 844 is not shown in FIGURES 15–18 so that the internal parts of recording income totalizing device 812 may more readily be seen.

Preferably, a guide 845, comprising an upper sheet 846 and a lower sheet 847 of metal foil or other flexible material, is disposed above plate 841 (as is best illustrated in FIGURES 16 and 19). If a data recording form is inserted between upper sheet 846 and lower sheet 847 and is urged toward the rear of device 812, the form is directed so that it does not jam or otherwise encumber the internal parts of device 812. The central portions of sheets 846, 847 are cut away so as to expose the numerals 836′ in a manner such that platen roller assembly 860 may press a data recording form against the numerals. The opening in upper sheet 846 is somewhat larger than that in lower sheet 847, as shown generally in FIGURE 16. The larger opening in sheet 846 is provided in order to permit a uniform application of pressure between the platen rollers and a recording form disposed above the numerals 836′. A plurality of openings 849 are provided in lower sheet 847 in order to expose the raised numerals 836′. The portion of sheet 847 surrounding opening 849 serves to support the recording form in opening 842 of plate 841.

In order that other information, in addition to the coin total registered on discs 836 may be recorded on the data recording form, a printing plate (not shown) adapted to point other information (e.g., the owner's name and the location, serial number, etc. of the coin receiving mechanism in which the device 812 is incorporated) may be mounted on horizontal plate 841 so that, when the coin total is imprinted on the data recording form, the other information will simultaneously be recorded. The openings in sheets 846, 847 are sufficiently large to permit the printing plate to contact an inserted recording form and to permit the latter to be contacted by platen roller assembly 860. In this manner, fraudulent practices may be minimized, since the location at which a given reading is taken will be permanently recorded at the same time the coin total is recorded.

As previously indicated, platen roller assembly 860 is provided in order to effect the recording of the raised numerals 836′ on a data recording form that is inserted into device 812. A pair of brackets 861, 862 are fixed to front wall 813 and rear wall 814 of device 812 by suitable means such as sheet metal screws 863. A pair of guide rods 864, 865 extend through aligned holes in brackets 861, 862, and each rod is held firmly in place by a pair of clips 866 on both sides of the rods as they extend through the holes in the brackets (see especially FIGURE 16). A pair of grooves 867, 868 are provided at each end of rod 864 adjacent brackets 861, 862 for a purpose that will hereinafter appear, and likewise a pair of grooves 869, 870 are provided in rod 865 adjacent brackets 861, 862.

A roller frame 875 is provided (see especially FIGURES 19 and 20), and a pair of grooves 876, 877 is formed in each side of frame 875 for respectively receiving rods 864, 865. Thus, frame 875 is axially slidable on rods 864, 865. Frame 875 is held against rods 864, 865 by a pair of spring members 878, 879 (see FIGURES 15, 16, and 18). Members 878, 879, made of spring metal or of any other suitable material, are mounted in slots in either side of frame 875 above the respective rods 864, 865. The ends of members 878, 879 are formed into downwardly projecting clips 880–883 which normally ride respectively on rods 864, 865. However, when frame 875 is positioned at either end of rods 864, 865, the corresponding pair of clips drop into the previously described grooves 867–870 in rods 864, 865 (see, for example, FIGURE 18, in which clip 882 is disposed in groove 868 of rod 864), thereby serving to positively position frame 875 and prevent in from undergoing unwanted sliding movement on rods 864, 865.

A pair of sides 885, 886 project downwardly, one from each side of frame 875 (see especially FIGURES 18–20). A slot 887 (see FIGURES 15 and 19) is provided in side 886, and a similar slot (not shown) is formed in side 885. Slot 887 has a lower, generally horizontal portion 888 and a portion 889 which angles upwardly (as seen in FIGURES 15 and 19). The slot in side 885 is similarly configured and is aligned with slot 887. The corresponding slots in sides 885, 886 are adapted to rotatably receive the ends of a shaft 890 for a purpose that will hereinafter appear. As shown in FIGURE 16, a bumper plate 884 interconnects sides 885, 886 of frame 875, and a pair of studs 884′ are provided on plate 884 for a purpose that will hereinafter appear.

A push-pull bracket 891 (see especially FIGURES 18–20) is slidably mounted between sides 885, 886 in the following manner. As seen in FIGURE 20, notched ribs 892, 893 extend inwardly from each of the sides 885, 886, and corresponding notches 894, 895 are formed in the body of frame 875. Bracket 891 has a pair of projecting side arms 896, 897 which respectively slidably fit between notch 894 and rib 892 and notch 895 and rib 893 (see FIGURES 18–20). As shown in broken lines in FIGURE 19, a slot 898 projects upwardly and to the right in arm 897, and a similar corresponding slot (not shown) is provided in arm 896. The slots in side arms 896, 897 partially overlap the slots formed in sides 885, 886, and, as bracket 891 is slidably moved with respect to frame 875, the point of intersection of the corresponding pairs of slots changes.

Previously described shaft 890 passes through the slots in the sides of bracket 891 as well as the slots in sides 885, 886 so that, as bracket 891 is slid with respect to frame 875, shaft 890 undergoes both a lateral and a vertical change in position. The extreme positions between which shaft 890 moves are shown in FIGURES 15 and 19, respectively, that is, upward and to the left as in FIGURE 15 and downward and to the right as in FIGURE 19.

A pair of platen rollers 900, 901 are mounted for rotation on shaft 890 (see especially FIGURES 18–20). While two platen rollers are shown in the drawing, as will be obvious to one skilled in the art, it is possible for a single roller to be utilized. However, the use of two platen rollers is preferred in order to accommodate dual printing operations as platen roller assembly 860 simultaneously passes over the previously mentioned printing plate and the numerals 836.

Although roller 900 is somewhat wider than roller 901, the construction of both is substantially similar, and accordingly only platen roller 900 will be described in detail. As shown in FIGURE 18, platen roller 900 comprises a substantially hollow cylinder 903 which is, at each end thereof, mounted for rotation of shaft 890 by means of a wheel member 904 (only one such wheel member being visible in the drawings). Wheel member 904 comprises an outer rim 905 and an inner hub 906 interconnected by three resilient spokes 907. As shown in FIGURE 18, spokes 907 have integrally formed compressible central sections 908. Thus, wheel member 904, which is preferably integrally formed of a resilient plastic material such as nylon, may be compressed out of its normal circular configuration. Cylinder 903 is also preferably formed of a resilient material so that the entire platen roller 900 is internally spring-loaded. The purpose for providing a spring-loaded platen roller will hereinafter appear.

A pull rod 911 passes through an opening in push-pull bracket 891 and is fixed thereto by means of a clip 912 (see FIGURES 16 and 18). Rod 911 slidably passes through an opening in bracket 862 (see FIGURES 15 and 16) and also passes slidably through another bracket 913 (see FIGURE 16) which is mounted between front wall 813 and rear wall 814 of device 812 by means such as sheet metal screws 914. Rod 911 terminates in a generally perpendicular handle portion 915 (shown only in FIGURE 15) adapted to be grasped by an operator so as to be manually pushed or pulled.

The manual operation of rod 911 causes platen rollers 900, 901 to pass over the exposed numerals 836′ and other printable information on the additional printing plate (e.g., name and location, serial number, etc.) and to effect the imprinting of a recording form inserted therebetween in the following manner. With the frame 875 and bracket 891 disposed in the respective positions shown in FIGURES 15 and 16, shaft 890 is in its raised position (relative to the lower portion of slots 887 and 898). If rod 911 is pulled toward the right (as seen in FIGURE 15), bracket 891 will first be moved toward the right, relative to the temporarily stationary frame 875, and thus the point of intersection between slots 887 and 898 moves downwardly and to the right, the point of intersection of the corresponding other pair of slots formed in the side 885 and arm 896 moving in a similar manner. As rod 911 continues to move toward the right, shaft 890 is finally disposed in the position shown in FIGURE 19 wherein it abuts against the lower end 888 of slot 887 and the lower end of the corresponding slot in side 885. Accordingly, plate 891 and frame 875 begin to move as a unit, clips 882, 883 moving out of grooves 868, 870 in rods 864, 865 as frame 875 slides toward the right. With shaft 890 disposed in its lowered position, the edges of platen rollers 900, 901 press against a data recording form which has been inserted through slot 843 in front wall 813 and between sheets 846, 847. The position of shaft 890 relative to horizontal plate 841 and discs 836 is such that the internally spring-loaded platen rollers 900, 901 are compressed as they pass thereover. This compression, in turn, results in the recording form being pressed firmly against the raised numerals 836′ and the additional printing plate (not shown), whereby the form is appropriately imprinted. FIGURE 19 illustrates the relative position of the various parts as platen rollers 900, 901 are being drawn across numerals 836′.

Continued movement of rod 911 toward the right pulls platen roller assembly 860 completely over the raised numerals 836′ to the extreme right-hand position wherein the ends of sides 885, 886 abut against bracket 862, clips 880, 881 respectively dropping into grooves 868, 869 in rods 864, 865. After the recording form on which the information has been imprinted is removed from the device, platen roller assembly 860 may be returned to its initial position. The return of assembly 860 is accomplished by pushing rod 911 (again via handle portion 915) toward the left (as seen in FIGURE 15). Clips 880, 881 move out of grooves 868, 869, and the assembly slides along rods 864, 865.

However, a printing operation cannot occur as assembly 860 moves back to its original position even if the recording form is left in the device by mistake. This safety feature, which prevents a blurring of the recorded information by reprinting, is achieved in the following manner. Initially, as rod 911 is pushed toward the left, push-pull bracket 891 slides toward the left with respect to the temporarily stationary frame 875. As this occurs the intersections of the slots through which shaft 890 passes move upwardly and toward the left. Thus, shaft 890 moves to its raised position (corresponding to that shown in FIGURE 15). The movement of shaft 890 to its raised position moves platen rollers 900, 901 to a position wherein they may be slid back to the FIGURE 15 position without contacting either a recording form left in the device or the exposed numerals 836′.

Means for accomplishing various disenabling and anti-cheat functions are provided in the form of the previously described shutter 844 (see FIGURE 24). Shutter 844 has a top portion 920 which covers the information recording portion of the device 812. Shutter 844 has a pair of slots 922 which are adapted to fit over projecting studs 923 formed on front wall 813 of device 812, and thus the shutter is vertically slidable with respect to the remaining portions of device 812 from a lowered position (shown in FIGURE 24) to a raised position wherein studs 923 are positioned adjacent the bottoms of slots 922. Shutter 844 has an elongated lateral slot 924 formed therein, and, when shutter 844 is positioned as shown in FIGURE 24, slot 924 is disposed below slot 843 (which is shown in broken lines in FIGURE 24) so that a data recording form cannot be inserted into the device. However, when shutter 844 is moved to its raised position, slot 924 overlies slot 843 whereby a recording form can be inserted between sheets 846, 847 of guide 845.

A horizontal tab 926 is provided along the lower edge of shutter 44, and tab 926 extends through an L-shaped opening 927 in front wall 813 for purposes that will hereinafter appear. A spring 928 is stretched between an opening in front wall 813 beneath opening 927 and tab 926 on shutter 844, whereby the shutter is biased toward the lowered position shown in FIGURE 24.

Front wall 813 is cut away at 929 (see FIGURE 24) so that top 920 of shutter 844 rests on bars 864, 865 when shutter 844 is disposed in its lowered position. In this position, shutter 844 impedes movement of platen roller assembly 860, since push-pull bracket 891 abuts against shutter top 920. Only when shutter 844 is moved to its raised position, wherein top 920 no longer lies in the path of assembly 860, may the printing operation be accomplished in the previously described manner. Thus, movement of shutter 844 to its raised position serves to condition device 812 for the carrying out of a printing operation.

Preferably, the entire device 812 will be disposed within a locked, protective casing (not shown), and for that reason horizontal tab 926 extends outwardly from shutter 844 and is adapted to be engaged by a lift lever (not shown) provided on the protective casing. Thus, an operator can cause shutter 844 to move from its lowered to its raised position merely by manually actuating the lift lever. Alternatively, the shutter could be raised by conventional electromechanical means such as a solenoid (not shown). Push-pull rod 911 extends through the protective casing so that handle portion 915 thereof may be grasped by the operator.

The movement of shutter 844 between its raised and lowered positions, in addition to conditioning device 812 for a printing operation, further serves to trip an actuating arm 931 of a switch 932 (see FIGURE 17) in the following manner. With shutter 844 disposed in its lowered position, tab 926 bears downwardly against arm 931, thereby holding arm 931 in a first position in opposition to its bias. However, when shutter 844 is moved to its raised position, arm 931 is free to move to its second position, whereby a controlled switching function is accomplished.

The opening and closing of switch 932 may, by means of conventional circuitry, be adapted to disenable the coin-receiving equipment. For example, the electrical circuitry of the coin-receiving equipment may be passed through switch 932 so that the actuation thereof, in response to the movement of shutter 844 to its raised position, open-circuits the coin-receiving equipment so that no coins may be deposited during the printing operation (i.e., while shutter 844 is raised). Thus, it is impossible for untotalized coins to be accumulated, and therefore the possibility of theft is minimized.

The actuation of switch 923 may also control warning signal means adapted to indicate that the device 812 is conditioned for a printing operation and that the coin-receiving equipment is disenabled. Thus, a warning lamp, indicated schematically at 933, may be illuminated via the actuation of switch 932 at the time the switch open-circuits the coin-receiving equipment. So long as the coin-receiving equipment is disenabled, lamp 933 remains lit. However, when shutter 844 is lowered after the printing operation, switch 932 is reactuated, lamp 933 is extinguished, and the coin-receiving equipment is conditioned for conventional operation.

The movement of shutter 844 from its lowered to its raised position also serves to disenable the previously described counting meter 832 in the following manner and hence to stabilize the numerals 836' during the printing operation. As seen in FIGURE 25, a disc 935 is mounted on shaft 835 of meter 832 for rotation therewith, and disc 935 (which may be formed integrally with one of the meter discs 836) has a plurality of ratchet indentations formed therein. A lever 936 is pivotally mounted about a shaft 937 which is journaled in meter frame 831. A pawl 938 is formed on lever 936, and pawl 938 is adapted to cooperate with an adjacent one of the indentations in disc 935 so as to impede rotation thereof and hence to prevent rotation of shaft 835, thereby disenabling meter 832. The position of lever 936 wherein pawl 938 is engaged with disc 935 so as to prevent rotation thereof is shown in full lines in FIGURE 25. When, however, lever 936 is pivoted downwardly (i.e., in a clockwise direction as seen in FIGURE 25), pawl 938 moves out of the adjacent indentation is disc 935 so as to permit free rotation of shaft 835. Accordingly, movement of lever 936 from its lowered position (illustrated in broken lines in FIGURE 25) to its raised position renders counting meter 832 inoperative.

An actuating arm 939 extends forwardly from lever 936, and arm 939 terminates in a lip 940 which extends through an opening 941 in front wall 813 (see FIGURE 15) and through a similar opening 942 in shutter 844 (see FIGURE 24). Preferably, as an added safety feature in addition to the described pawl 938 and disc 935, other pawls (not shown) may be provided in association with lever 936, whereby the movement of lever 936 serves to impede the rotation of all of the discs 936. When shutter 844 is moved to its raised position, the lower edge of opening 942 therein bears upwardly against lip 940, and lever 936 pivots upwardly so as to disenable the meter 832 and thus to stabilize the numerals 836' during the printing operation.

A data recording form adapted for use in conjunction with the device 812 is disclosed and claimed in a co-pending United States patent application entitled Data Recording Form, Ser. No. 463,824, now abandoned, filed in the name of Albinus G. Bodoh and Jacob C. Kiefer, and commonly assigned. A typical recording form 950 of the type disclosed therein is shown in FIGURE 21.

Briefly, form 950 comprises a generally rectangular body 951 and a separate stub 952. Preferably, stub 952 is formed integrally with body 951 and is partially separated therefrom by a plurality of conventional perforations 954. Thus, stub 952 may be easily separated from body 951 by a manual tearing operation.

When recording form 950 is inserted into device 812 through slot 924 and slot 843, an end 953 of stub 952 abuts against rear wall 814 of device 812, and platen roller assembly 860 may be passed over the form so as to record thereon the accumulated coin value recorded on discs 836. Subsequently, stub 952 may be removed by tearing along the line of perforations 954 so that body 951 can be re-inserted in device 812 in the previously described manner until the line of perforations 954 abuts against rear wall 814. Then, platen roller assembly 860 can be again passed over the shortened form 950 so that a second coin value is imprinted thereon at a new location. When form 950 is thereafter removed from device 812, the incremental change in accumulated coin value occurring between the time the two readings were taken may easily be obtained by subtraction.

As will be obvious to one skilled in the art, various printed indicia may be provided on the face of recording form 950 in order to prelabel the spaces in which data is recordable and to provide spaces for entering or calculating other data. Thus, as shown in FIGURE 21, the total registered on discs 836 will respectively be recorded at the points labelled "FIRST READING" and "FINAL READING" on the form 950. Such a form may be utilized with a recording device of the type described herein if the counting meter 832 thereof provides an accumulated coin value reading which is right side up (as seen in FIGURE 16).

It is, of course, also possible that the accumulated coin recorded value will be upside down as seen in FIGURE 16). In this event, as shown in FIGURE 22, the various printed notations on form 950 should be reversed in position (relative to the printing shown in FIGURE 21). The only substantial difference between the use of a form such as that shown in FIGURE 21 and that shown in FIGURE 22 is that in the latter case the final reading will appear above the first reading, thereby facilitating the calculation by subtraction of the difference between the two readings. However, in both cases the structure of the forms 950 is identical (i.e., corresponding portions 951 and 952 joined by a line of perforations 954), and only the labeled indicia notations are appropriately varied.

Preferably, form 950 is formed of a conventional pressure-sensitive paper adapted to be permanently marked in response to the impression of the raised numerals on discs 836. If such pressure-sensitive paper is utilized, it is not necessary to provide carbon or other transfer papers in association with the recording form 950. A preferred type of pressure-sensitive paper is described in the said co-pending patent application.

Also, as disclosed in the said co-pending patent application, it is preferable that a series of recording forms, similar to form 950, be used at the same time, and this may be conveniently accomplished by attaching the stubs 152 of several forms together with a suitable adhesive material. Additionally, the bodies of the forms may be attached to one another adjacent the perforations 954 so that the forms can be maintained as a unit after the stubs are separated for use as a unit during the second printing operation. In this manner, multiple copies of the income record can conveniently be obtained.

FIGURE 23 illustrates in schematic form alternate embodiment of the subject invention in the form of a recording income totalizing device 960. Device 960 is provided with an internal paper supply preferably comprising a roll of pressure-sensitive paper 961 mounted on a shaft 962 which is journaled between a pair of brackets 963, 964 on a rear wall portion 965 of device 960. The paper (as indicated by reference character 961') is passed from roll 961 over a counting meter 966 comprising a plurality of discs having raised numerals formed thereon (exposed numerals being shown in broken lines in FIGURE 23).

Thus, it is unnecessary for an operator to insert a recording form into device 960. Instead, the operator merely carries out a printing operation, as hereinafter described, and thereafter pulls the paper 961' from the device 960 and tears off the portion having the accumulated coin value printed thereon. The paper roll 961 may be perforated at suitable intervals so as to provide for easy separation after the printing operation. Also, the paper of roll 961 may, for example, be two- or three-ply in thickness in order to provide for the printing of multiple copies of each income record.

Another modification provided in the embodiment illustrated in FIGURE 23 involves electromechanical means for accomplishing a printing operation. A platen roller assembly 970 is linked by means of a yoke 971 to a plunger 972 of a conventional solenoid unit 973 having a stroke long enough to move the platen roller assembly 970 over the counting meter 966. Thus, actuation of solenoid 973 in response to the manual closing of a switch (not shown) automatically results in the imprinting of the registered coin value total on the paper 961'.

It will be seen from the foregoing description that the present invention provides a novel combination adapted to readily accumulate the value of coins deposited in a coin-receiving device and, furthermore, adapted to quickly and easily provide either a visual of a permanent printed record (or even both, if desired) of the accumulated value of deposited coins. As such, a significant advance is provided over prior art devices which provide only for the accumulation and recordation of the number rather than the value of deposited coins.

It should be understood that the foregoing description of structure and of operation in terms of coin operation was adopted for simplicity of presentation only, since obviously alternate approaches for establishing credit values (such as by the use of tokens or of paper currency) could be readily accommodated in the practice of the subject invention. Accordingly the invention should not be construed as limited to such coin operation (even though a coin environment may be referred to for simplicity) but rather embraces all such equivalent approaches for establishing credit values.

It should further be understood that various changes, modifications, and variations may be made in the details of construction, arrangements, and operations of the various elements disclosed herein, without departing from the spirit and the scope of the present invention, as defined in the appended claims.

What is claimed is:

1. A device for totalizing the cumulative value of coins inserted into a coin receiving mechanism comprising:
   a shaft;
   a housing mounted on the shaft for axial displacement relative thereto;
   a coin determinative pawl actuator mounted in the housing for rotation about the shaft;
   a ratchet wheel mounted in the housing for rotation about the shaft;
   means for rotating the ratchet wheel;
   coin signal means for axially displacing the housing to free the ratchet wheel for rotation;
   means inter-engaging the coin determinative pawl actuator and the ratchet wheel for rotation;
   means limiting the rotation of the coin determinative pawl actuator when it is engaged by the ratchet wheel such that the ratchet wheel rotates by an amount proportionate to the signaled coin value; and
   means responsive to the rotation of the ratchet wheel to record the signaled coin value.

2. A device as claimed in claim 1 wherein the means responsive to the rotation of the ratchet wheel comprises:
   a gear member mounted in the housing for rotation about the shaft from a position of predetermined relative angular orientation with respect to the ratchet wheel;
   means responsive to deviation of the gear member and the ratchet wheel from the said orientation for rotating the gear member relative to the ratchet wheel such that the said orientation is re-achieved; and
   gear driven counter means responsive to rotation of the gear member for recording the signaled coin value.

3. A device as claimed in claim 2 wherein the means for rotating the gear member relative to the ratchet wheel comprises:
   a motor drive means for gear driving the gear wheel; and
   cam actuated switch means for energizing the motor drive means.

4. A device as claimed in claim 3, which further comprises:
   signal lamp means in parallel with the motor drive means such that a finite duration of illumination proportionate to the signaled coin value is exhibited.

5. An income totalizing device for totalizing the cumulative value of coins deposited in a coin receiving mechanism comprising:
   a limited access box associated with the coin receiving mechanism;
   a shaft positioned within the limited access box;
   a first rotatable member mounted on the shaft;
   a second rotatable member mounted on the shaft;
   spring means interconnecting the said members for rotation of the first member relative to the second member;
   means retaining the said members in a given relative angular orientation;

coin signal means responsive to the deposit of a coin in the coin receiving mechanism;

means responsive to the coin signal means for rotating the first rotatable member relative to the second rotatable member by a predetermined angular increment;

means responsive to deviation of the said members from the said orientation for rotating the second rotatable member relative to the first rotatable member by the said angular increment such that the said orientation is re-achieved; and means responsive to rotation of the second rotatable member for indicating the value of the deposited coin.

6. A device for totalizing the cumulative value of coins having respective coin denominations of $C_1$, $C_2$, and $C_3$, which comprises:

a shaft;

a first rotatable member mounted on the shaft;

a second rotatable member mounted on the shaft;

spring means interconnecting the said members for rotation of the first member relative to the second member;

means retaining the said members in a given relative angular orientation;

coin signal means responsive to the said coin denominations;

means responsive to the coin signal means for rotating the first rotatable member relative to the second rotatable member by a predetermined angular increment from the said orientation;

means responsive to deviation of the said members from the said orientation for rotating the second rotatable member relative to the first rotatable member by the said angular increment such that the said orientation is re-achieved; and means responsive to rotation of the second rotatable member for indicating the coin values, where the said given angular increment equals a first given amount, $(C_2/C_1)$ times the said amount, and $(C_3/C_1)$ times the said amount for the respective $C_1$, $C_2$, and $C_3$ signaled denominations.

7. A device as claimed in claim 6 wherein the means for rotating the first rotatable member relative to the second rotatable member comprises a rotatable coin determinative pawl actuator mounted on the shaft for engagement with the first rotatable member and wherein the coin signal means comprises solenoid actuated pin members, one for each respective coin denomination, adapted to limit the rotation of the coin determinative pawl actuator and thereby to limit the rotation of the first rotatable member to the said angular increment.

8. A device as claimed in claim 6 wherein the means for rotating the second rotatable member relative to the first rotatable member comprises:

motor drive means;

gear means for rotating the second member relative to the first member in response to actuation of the motor drive means; and cam operated switch means to actuate the motor drive means whenever the said orientation is changed.

9. A device for indicating the cumulative total of coins of varying denominations inserted into a coin receiving mechanism comprising:

a shaft;

a housing mounted on the shaft for axial displacement relative thereto from a rest position;

a coin determinative pawl actuator mounted in the housing for rotation about the shaft;

pawl spring means positioning the coin determinative pawl actuator in a rest position relative to the housing;

a wheel mounted in the housing for rotation about the shaft;

wheel spring means for rotating the wheel;

pawl means on the housing for retaining the wheel in a rest position relative to the housing;

pawl means on the coin determinative pawl actuator for interjoining the wheel and the coin determinative pawl actuator;

coin signal means comprising a series of solenoid actuated pin members, one for each coin denomination, each pin member adapted when actuated in response to a coin signal of its coin denomination to axially displace the housing, thereby to disengage the pawl means on the housing for rotation of the wheel and to engage the pawl means on the coin determinative pawl actuator for interjoined rotation of the wheel and the coin determinative pawl actuator;

stop means on the coin determinative pawl actuator for engaging an actuated pin member so as to limit the rotation of the wheel to an angular increment corresponding to the coin denomination of the pin member, the angular increment of rotation of the wheel for each respective coin denomination being proportional to the relative value of the coin denomination;

spring means for replacing the housing in its rest position, thereby re-engaging the pawl means on the housing for retention of the wheel and disengaging the pawl means on the coin determinative pawl actuator such that the coin determinative pawl actuator is returned to its rest position by the pawl spring means;

a gear member mounted for rotation on the shaft;

drive means for rotating the gear member;

means responsive to deviation from a fixed relative angular disposition of the gear member and the wheel to activate the drive means;

gear driven counter means; and driving gear means on the gear member for driving the the counter means, whereby actuation of a given pin member results in rotation of the wheel, the gear member, and the counter means in proportionate angular increments corresponding to the coin denomination of the pin member.

10. A device as claimed in claim 9, wherein the said means responsive to deviation from a fixed relative angular disposition of the gear member and the wheel to activate the drive means comprises cam actuated switch means.

11. A device as claimed in claim 9 for use in a coin system having 1:2:5:10 relative coin values wherein the displacement and replacement of the housing to and from its rest position allows the wheel to rotate by a given degree of angular rotation, and wherein the respective stop means on the coin determinative pawl actuator for the 1:2:5:10 relative coin values are spaced from the respective pin members by zero, one, four, and nine times the said given degree of angular rotation when the coin determinative pawl actuator is in its said rest position, such that the wheel exhibits one, two, five, and ten times the said given degree of angular rotation for each respective coin denomination.

12. A device for totalizing the cumulative value of coins inserted into a coin receiving mechanism comprising:

a shaft;

a housing mounted on the shaft for axial displacement relative thereto;

a coin determinative pawl actuator mounted in the housing for rotation about the shaft;

a ratchet wheel mounted in the housing for rotation about the shaft;

a gear member mounted for rotation on the shaft and normally held in a given rest position relative to the ratchet wheel;

means for rotating the ratchet wheel;

coin signal means for axially displacing the housing to free the ratchet wheel for rotation;

means interengaging the coin determinative pawl actuator and the ratchet wheel when the housing is axially displaced;

means limiting the rotation of the coin determinative pawl actuator when it is engaged by the ratchet wheel such that the ratchet wheel rotates by an amount proportionate to the signaled coin value;

means responsive to rotation of the ratchet wheel relative to the gear member to rotate the gear member by an amount proportionate to the angular rotational increment of the ratchet wheel;

gear driven counter means to record the signaled coin value; and driving gear means on the gear member for driving the counter means;

whereby angular displacement of the ratchet wheel relative to the gear member causes a corresponding tracking rotation of the gear member until the initial rest position is achieved, the tracking of the wheel by the gear member causing a proportionate actuation of the counter means such that the signaled coin value is recorded.

13. A device as claimed in claim 12 wherein the said means for rotating the ratchet wheel comprises a torsion spring having one end fixed to the ratchet wheel and having the other end fixed to the gear member, such that motive power for rotation of the ratchet wheel is stored in the said spring means as the gear member tracks the rotational movement of the ratchet wheel.

14. A device for indicating the cumulative total of nickels, dimes, quarters, and half-dollars which have been received in a coin sensitive mechanism which comprises:
a shaft;
a housing mounted on the shaft for axial displacement relative thereto;
a coin determinative pawl actuator mounted in the housing for rotation about the shaft;
a ratchet wheel mounted in the housing for rotation about the shaft and having a first set of ratchet teeth and a second set of ratchet teeth, the said sets of ratchet teeth each having a given number of $n$ teeth at an angular separation of $(360/n)°$ where $n$ is a positive integer and each being staggered relative to the other by a half-tooth angular increment;
a first ratchet tooth pawl in the housing normally retaining the ratchet wheel in a fixed angular relation relative to the housing by engagement with the first set of ratchet teeth;
a second ratchet tooth pawl on the coin determinative pawl actuator adapted to engage the second set of ratchet teeth;
a solenoid assembly comprising four individual solenoids respectively pulse energized in response to a coin signal of nickel, dime, quarter, and half-dollar denominations;
a pin member for each solenoid adapted to axially displace the housing in response to energization of its respective solenoid thereby to free the first ratchet tooth pawl from engagement with the first set of ratchet teeth and to engage the second ratchet tooth pawl with the second set of ratchet teeth;
spring means normally retaining the coin determinative pawl actuator in a rest position;
a series of peripherally spaced nickel, dime, quarter, and half-dollar abutment stops on the coin determinative pawl actuator, the said abutment stops being respectively spaced from the corresponding pin members by $0°$, $(360/n)°$, $4(360/n)°$, and $9(360/n)°$ of angular separation when the coin determinative pawl actuator is in its rest position;
a gear member mounted for rotation about the shaft;
a torsion spring having its one end fixed to the gear member and its other end fixed to the ratchet wheel;
drive means for rotating the gear member so as to wind the torsion spring;
switch means responsive to deviation from a fixed relative angular disposition of the gear member and the ratchet wheel to activate the drive means;
gear driven counter means; and
driving gear means on the gear member for driving the counter means,
whereby the torsion spring rotates the ratchet wheel $(360/n)°$, $2(360/n)°$, $5(360/n)°$ and $10(360/n)°$ respectively upon energization of the respective nickel, dime, quarter, and half-dollar solenoids; the drive means rotate the gear member in corresponding amounts; and the gear member proportionately actuates the counter means to record the coin value signaled.

15. A device as claimed in claim 14 for installation in a nickel, dime, quarter, and half-dollar receiving main vending unit equipped with a credit sensing mechanism and having remote vending units respectively equipped with independent credit sensing mechanisms, which further comprises circuit means including:
main unit credit switch means respectively associated with each main unit solenoid and actuated thereby to establish a credit signal in the main vending unit credit sensing mechanism;
a remote unit relay assembly comprising three individual solenoids respectively pulse energized in response to a coin signal of nickel, dime, and quarter denominations;
remote unit switch means responsive to energization of any of the remote unit solenoids to energize the corresponding main unit solenoid; and
time delay means for de-activating the main unit credit switch means when a main unit solenoid is energized by its corresponding remote unit solenoid.

16. A device as claimed in claim 14, which further comprises circuit means including:
an electric motor for supplying power to the said drive means; and
signal lamp means in parallel with the electric motor such that a finite duration of illumination proportionate to the signaled coin value is exhibited.

17. An income totalizing device for totalizing the cumulative value of coins received in a coin-operated mechanism, comprising:
a first movable member;
a second member adapted to track and follow the movement of the first member;
spring means interconnecting the said members and adapted to urge movement of the first member relative to the second member;
impeding means normally preventing discharge of the spring means so as to retain the said members in a given relative orientation;
coin signal means responsive to the deposit of a coin in the coin-operated mechanism;
release means responsive to the coin signal means for releasing the impeding means, thereby to allow spring-powered movement of the first member relative to the second member;
means limiting the movement of the first member relative to the second member to a predetermined increment proportionate to the denomination of the deposited coin;
means responsive to deviation of the said members from the said orientation for moving the second member relative to the first member by the said predetermined increment such that the said orientation is re-achieved and such that the spring means are re-charged; and
means responsive to movement of the second member for indicating the value of the deposited coin.

18. A device for totalizing the cumulative value of coins received in a coin-operated mechanism comprising:
a housing;
a coin determinative pawl actuator movably mounted in the housing;

a first movable member mounted in the housing;
a second movable member mounted in the housing and normally held in a given rest position relative to the first member;
means for displacing the first member;
locking means in the housing normally impeding the displacement of the first member;
coin signal means adapted to free the first member for displacement;
means interengaging the coin determinative pawl actuator and the first member when the said member is freed for displacement;
means limiting the movement of the coin determinative pawl actuator when it is engaged by the first member such that the said member is displaced by an amount proportionate to the signaled coin value;
means responsive to displacement of the first member relative to the second member to displace the second member by an amount proportionate to the displacement of the first member; and
gear driven counter means actuated by displacement of the second member to record the signaled coin value,
whereby displacement of the first member relative to the second member causes a corresponding tracking displacement of the second member until the initial rest position is achieved, the tracking of the first member by the second member causing a proportionate actuation of the counter means such that the signaled coin value is recorded.

19. A system for totalizing the cumulative value of coins of at least two denominations received in a coin-operated vending installation having a main unit equipped with a credit sensing mechanism and having a remote unit equipped with an independent credit sensing mechanism, the said system comprising:
electromagnetic coin signal means in the main unit for each of the said coin denominations and adapted to be pulse energized upon the receipt in the main unit of a coin having the denomination associated therewith;
electromagnetic coin signal means in the remote unit for each of the said coin denominations and adapted to be pulse energized upon the receipt in the remote unit of a coin having the denomination associated therewith;
main unit credit switch means adapted to be actuated by the main unit coin signal means to establish a credit signal in the main unit credit sensing mechanism corresponding to the denomination of the coin received in the main unit;
remote unit switch means responsive to energization of the remote unit coin signal means to energize the corresponding main unit coin signal means;
time delay means for de-activating the main unit credit switch means upon energization of the main unit coin signal means by the corresponding remote unit coin signal means; and
means responsive to energization of the main unit coin signal means for totalizing the cumulative value of coins received in both the main unit and the remote unit.

20. A system as claimed in claim 19 and further comprising:
signal lamp means; and
means for illuminating the signal lamp means for a finite duration proportionate to the denomination of a coin received in the vending installation.

21. A device for totalizing cumulative income values comprising:
a frame;
movable actuator means normally retained in a given rest position relative to the frame;
movable ratchet means normally retained in a given rest position relative to the frame;
credit signal means adapted to be actuated in selective response to the value of an income increment to be credited;
means responsive to the credit signal means for effecting a positioning of the movable actuator means relative to its given rest position;
means for translating the said positioning of the movable actuator means into a positioning of the movable ratchet means relative to its given rest position, the said positioning of the movable ratchet means being determined by the said positioning of the movable actuator means;
stop means responsive to the said credit signal means and adapted to engage the movable actuator means to limit the said positioning thereof to an amount corresponding to the signaled income value; and
means responsive to the said positioning of the movable ratchet means to indicate the signaled income value.

22. A device as claimed in claim 21 and further comprising:
track and follow means normally maintained in a given rest position relative to the movable ratchet means and adapted to track and follow any movement of the movable ratchet means from its given rest position relative to the frame so as to re-establish said given rest position of the track and follow means relative to the movable ratchet means as a result of any said movement; and
credit value indicating means responsive to movement of the track and follow means for recording the signaled income value.

23. A device as claimed in claim 21 and further comprising means adapted to imprint the signaled income value on a recording medium.

24. A device for totalizing cumulative income values comprising:
a frame;
a movable actuator member normally retained in a given rest position relative to the frame;
a movable ratchet member normally retained in a given rest position relative to the frame;
credit signal means comprising a plurality of solenoid actuated pin members, each pin member being adapted to be actuated in selective response to the value of a particular income increment to be credited;
means responsive to the credit signal means for effecting a movement of the ratchet member relative to its given rest position;
means interengaging the actuator member and the ratchet member during at least a portion of the movement of the latter;
each of the said solenoid actuated pins members being adapted to selectively engage the movable actuator member and limit the movement thereof to an amount corresponding to the value of the particular income increment associated with that pin member; and
means responsive to the extent of movement of the ratchet member to indicate the signal income value.

25. A device for indicating the cumulative total in incremental amounts of coins inserted into a coin receiving mechanism, comprising:
a shaft;
a ratchet member mounted for rotation on the shaft and normally held in a given rest position relative to the shaft;
a pawl actuator mounted for rotation on the shaft and normally held in a given rest position relative to the shaft;
coin signal means for signaling the denomination of an inserted coin;
a plurality of stop means each of which is responsive to the coin signal means and adapted to engage the pawl actuator and limit the movement thereof;
means for reciprocably rotating the pawl actuator by an angular increment the extent of which is dependent upon which of the said stop means is engaged, which is determined by the coin denomination signaled by the coin signal means;

escapement pawl means responsive to the reciprocable rotation of the pawl actuator to rotate the ratchet member by an angular increment determined by the said predetermined angular increment; and counter means responsive to rotation of the ratchet member to record the signaled coin denomination.

26. A device for cumulatively totalizing in incremental amounts the value of coins of a first $C_1$ and of a second $C_2$ denomination which are deposited in a coin receiving mechanism, which comprises:

a housing;

ratchet means rotatably mounted in the housing;

first $C_1$ denomination crank means rotatably mounted in the housing and normally biased to a given rest position;

second $C_2$ denomination crank means rotatably mounted in the housing and normally biased to a given rest position;

first solenoid actuated means responsive to the deposit of a $C_1$ coin for effecting rotation of the first crank means from its given rest position;

second solenoid actuated means responsive to the deposit of a $C_2$ coin for effecting rotation of the second crank means from its given rest position;

advancing pawl means responsive to rotation of either of the crank means for rotating the ratchet means by a given amount when the first crank means is rotated and by an amount $(C_2/C_1)$ times as great as the said given amount when the second crank means is rotated; and gear registry means responsive to rotation of the ratchet means for cumulatively totalizing in incremental amounts either the $C_1$ or $C_2$ coin denominations.

27. A device for cumulatively totalizing in incremental amounts the value of nickels, dimes, quarters, and half-dollars which are deposited in a coin receiving mechanism which comprises:

a housing;

ratchet means rotatably mounted in the housing;

nickel, dime, quarter, and half-dollar crank means rotatably mounted in the housing and each normally biased to a given rest position;

nickel, dime, quarter, and half-dollar solenoid actuated means responsive to the deposit of nickels, dimes, quarters, and half-dollars respectively for effecting rotation of the corresponding crank means from their respective rest positions;

advancing pawl means responsive to rotation to any one of the crank means for rotating the ratchet means by a given amount; twice the said given amount; five times the said given amount; and ten times the said given amount when the respective nickel, dime, quarter, and half-dollar crank means are rotated by the corresponding solenoid actuated means; and gear registry means responsive to rotation of the ratchet means for cumulatively totalizing in incremental amounts either the nickel, dime, quarter, or half-dollar denominations.

28. An income totalizing device for totalizing in incremental amounts the cumulative value of coins deposited in a coin receiving mechanism comprising:

a shaft;

a first member mounted for rotation with respect to the shaft;

a second member mounted for rotation with respect to the shaft;

means normally retaining the said members in a given rest position;

coin signal means comprising a plurality of solenoid actuated pin members, each pin member being selectively responsive to the denomination of a particular coin deposited in the coin-receiving mechanism;

means responsive to the coin signal means for positioning the first member relative to its given rest position; each of the said solenoid actuated pin members being adapted to selectively engage the first member and limit the rotation of the first member relative to its given rest position to a predetermined angular increment corresponding to the denomination of the particular coin associated with that pin member;

means responsive to the positioning of the first member relative to its given rest position for positioning the second member relative to its given rest position by an angular increment determined by the said predetermined angular increment; and means responsive to the positioning of the second member for indicating the value of the deposited coin.

29. A device for totalizing in incremental amounts the cumulative value of coins inserted into a coin receiving mechanism, comprising:

a shaft;

a pawl actuator mounted for rotation about the shaft;

a ratchet wheel mounted for rotation about the shaft;

a gear member mounted for rotation to an extent determined by the extent of rotation of the ratchet wheel;

spring means adapted to drive the pawl actuator from its initial disposition;

coin signal means corresponding to a given coin denomination for causing the force of the spring means to be applied to the pawl actuator to reciprocally rotate the pawl actuator relative to the shaft by a given amount first in a given direction away from the initial disposition of the pawl actuator and then in the opposite direction back to the said initial disposition;

advancing pawl means interengaging the pawl actuator and the ratchet wheel for conjoint rotation when the pawl actuator is rotated in one of the said directions;

means limiting the said amount of rotation of the pawl actuator such that the ratchet wheel rotates by an amount proportionate to the signaled coin value;

gear driven counter means to record the signaled coin value; and driving gear means on the gear member for driving the counter means.

30. A device as claimed in claim 29 and further comprising:

locking pawl means for arresting rotation of the ratchet wheel in the direction opposite to the direction of conjoint rotation.

31. A device as claimed in claim 30 in which the said means limiting the rotation of the pawl actuator comprises a stop member adapted for positioning in the path of movement of the pawl actuator.

32. A device for totalizing cumulative income values comprising:

a frame;

movable actuator means normally retained in a given rest position relative to the frame;

movable ratchet means normally retained in a given rest position relative to the frame;

credit signal means comprising a plurality of solenoid actuated pin members, each pin member being adapted to be actuated in selective response to the value of a particular income increment to be credited;

means responsive to the credit signal means for effecting a positioning of the movable actuator means relative to its given rest position.

means for translating the said positioning of the movable actuator means into a positioning of the movable ratchet means relative to its given rest position, the said positioning of the movable ratchet means being determined by the said positioning of the movable actuator means;

each of the said solenoid actuated pin members being adapted to selectively engage the movable actuator means and limit the said positioning thereof to an amount corresponding to the value of the particular income increment associated with that pin member; and means responsive to the said positioning of the movable ratchet means to indicate the signaled income value.

References Cited

UNITED STATES PATENTS

| | | | |
|---|---|---|---|
| 2,100,061 | 11/1937 | Sundelin et al. | 346—22 |
| 2,117,144 | 5/1938 | Calvert | 194—85 |
| 2,435,933 | 2/1948 | Toolan | 194—9 |
| 2,459,008 | 1/1949 | Tratsch | 74—126 |
| 2,518,810 | 8/1950 | Nelsen et al. | 235—92 |
| 2,586,173 | 2/1952 | Nelsen | 235—92 |
| 2,649,947 | 8/1953 | Nelsen | 194—10 |
| 2,922,575 | 1/1960 | Durant | 235—132 |
| 2,923,165 | 2/1960 | Patzer | 74—126 |

FOREIGN PATENTS 788,324  12/1957  Great Britain.

RICHARD B. WILKINSON, *Primary Examiner.*

S. A. WAL, *Assistant Examiner.*